(12) United States Patent
DeBourke et al.

(10) Patent No.: US 7,477,950 B2
(45) Date of Patent: Jan. 13, 2009

(54) METHOD AND SYSTEM FOR CONTROLLING A NETWORK OF WATER APPLIANCES

(75) Inventors: Patrick DeBourke, Paradise (CA); Matthew Troke, St. John's (CA)

(73) Assignee: DyMOCOM, Inc., Paradise, Newfoundland (CA)

( * ) Notice: Subject to any disclaimer, the term of this patent is extended or adjusted under 35 U.S.C. 154(b) by 315 days.

(21) Appl. No.: 11/142,349

(22) Filed: Jun. 2, 2005

(65) Prior Publication Data
US 2006/0069453 A1 Mar. 30, 2006

Related U.S. Application Data

(60) Provisional application No. 60/613,516, filed on Sep. 28, 2004.

(51) Int. Cl.
G05B 15/02 (2006.01)
G05B 11/01 (2006.01)
G05B 15/00 (2006.01)
G05B 13/02 (2006.01)
G05D 7/00 (2006.01)

(52) U.S. Cl. .............. 700/19; 700/9; 700/44; 700/45; 700/275; 700/276; 700/284

(58) Field of Classification Search .......... 700/19, 700/9, 45, 275, 276, 284
See application file for complete search history.

(56) References Cited

U.S. PATENT DOCUMENTS

| | | | |
|---|---|---|---|
| RE30,229 E * | 3/1980 | Berman et al. ............. 290/1 R |
| 4,420,811 A | 12/1983 | Tarnay et al. | |
| 4,611,757 A | 9/1986 | Saether | |
| 4,688,273 A | 8/1987 | Lyng | |
| 4,854,498 A | 8/1989 | Stayton | |
| 4,875,623 A | 10/1989 | Garris | |

(Continued)

FOREIGN PATENT DOCUMENTS

EP 0 716 361 A2 12/1996

(Continued)

OTHER PUBLICATIONS

"Key Guide Specification", Automated Logic Corporation Aug. 2001 p. 1-27.*

(Continued)

*Primary Examiner*—Albert DeCady
*Assistant Examiner*—Thomas H Stevens
(74) *Attorney, Agent, or Firm*—Bereskin & Parr

(57) ABSTRACT

An appliance control system is described for controlling a plurality of appliances. The system includes a control station located remotely from the appliances and having a control unit for controlling the plurality of appliances, at least one client station being associated with at least one of the plurality of appliances and being adapted for allowing a user to make requests to the control station for using the at least one of the plurality of appliances, actuators connected to the control station and the at least one of the plurality of appliances for receiving control signals from the control station and controlling the at least one of the plurality of appliances, and sensors connected to the water appliance and the control station for recording information about the at least one of the plurality of appliances and providing the information to the control station.

26 Claims, 9 Drawing Sheets

U.S. PATENT DOCUMENTS

| | | | |
|---|---|---|---|
| 5,931,181 A | 8/1999 | Cook et al. | |
| 6,250,558 B1 | 6/2001 | Dogre Cuevas | |
| 6,351,603 B2 | 2/2002 | Waithe et al. | |
| 6,438,770 B1 | 8/2002 | Hed et al. | |
| 6,446,875 B1 | 9/2002 | Brooks et al. | |
| 6,665,384 B2* | 12/2003 | Daum et al. | 379/102.03 |
| 6,826,267 B2* | 11/2004 | Daum et al. | 379/102.03 |
| 6,862,482 B2* | 3/2005 | Peterson et al. | 700/19 |
| 7,164,972 B2* | 1/2007 | Imhof et al. | 700/276 |
| 7,286,918 B2* | 10/2007 | Koenig et al. | 701/36 |
| 2002/0094799 A1* | 7/2002 | Elliott et al. | 455/405 |
| 2002/0134847 A1 | 9/2002 | Brooks et al. | |
| 2002/0144341 A1 | 10/2002 | Zieger | |
| 2003/0195640 A1* | 10/2003 | Krocker et al. | 700/26 |
| 2004/0260407 A1* | 12/2004 | Wimsatt | 700/19 |
| 2005/0060232 A1 | 3/2005 | Maggio | |
| 2005/0154494 A1* | 7/2005 | Ahmed | 700/275 |
| 2006/0168611 A1* | 7/2006 | Fima | 725/10 |
| 2006/0238335 A1* | 10/2006 | Karaoguz et al. | 340/539.14 |
| 2006/0253330 A1 | 11/2006 | Maggio et al. | |

FOREIGN PATENT DOCUMENTS

| | | |
|---|---|---|
| EP | 0 792 971 A1 | 3/1997 |
| EP | 0 864 954 A1 | 9/1998 |
| FR | 2 792 751 | 10/2000 |
| JP | 03-144228 | 6/1991 |

OTHER PUBLICATIONS

American Standard Ceratherm Central Thermostat Less Volume Control, 2003, p. 1-2.

Search Report for corresponding European patent application EP 05 07 7214 dated Sep. 20, 2007.

* cited by examiner

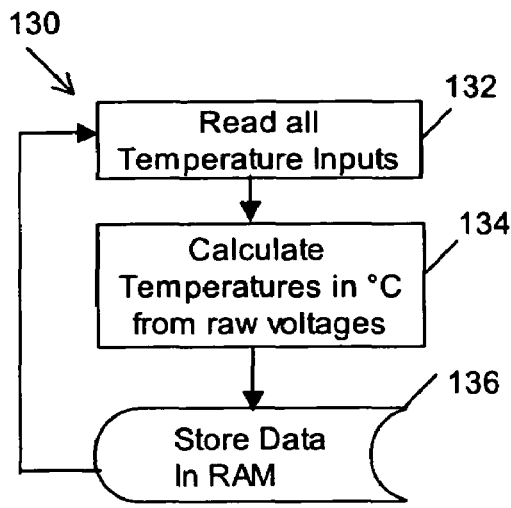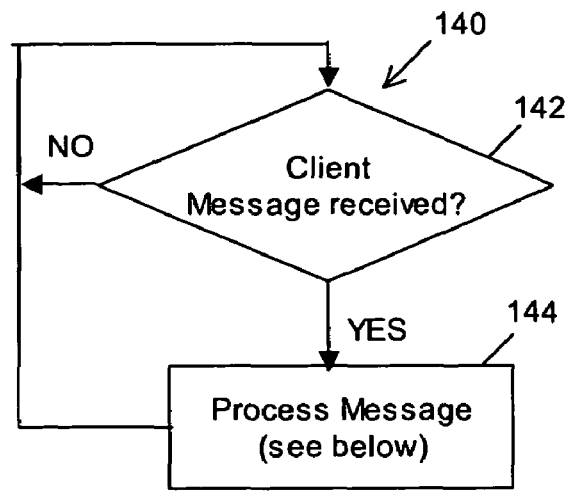
Figure 4a
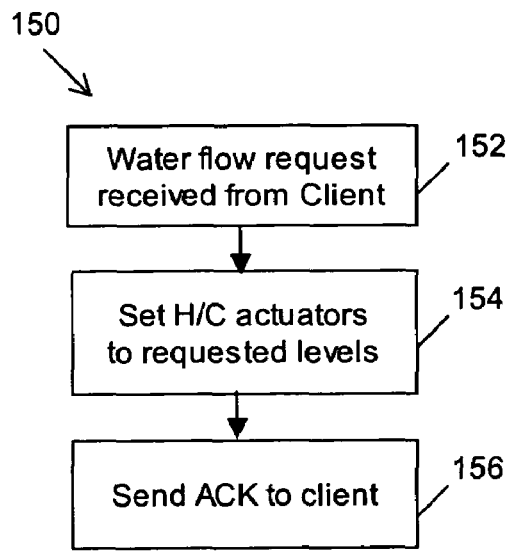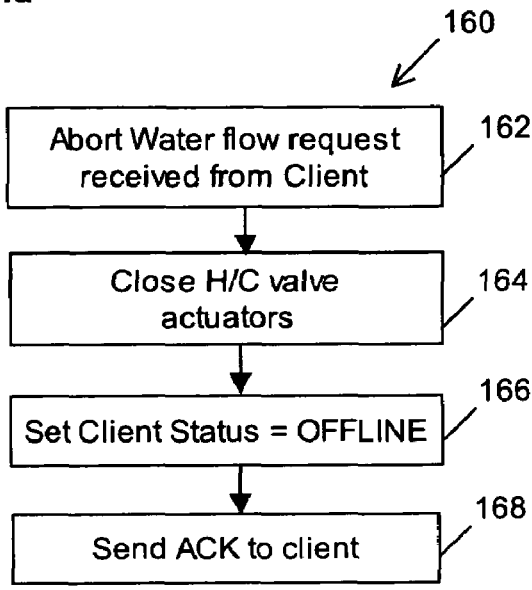
Figure 4b  Figure 4c
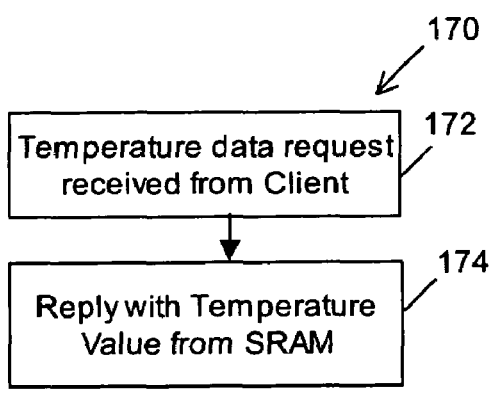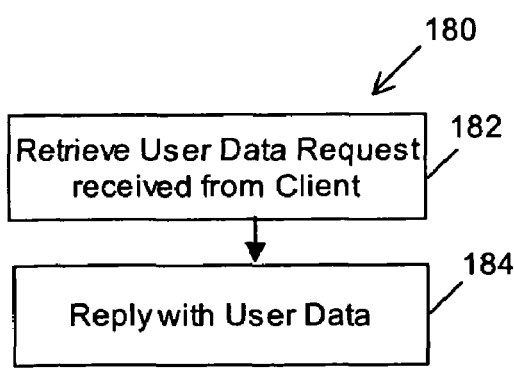
Figure 4d  Figure 4e

METHOD AND SYSTEM FOR CONTROLLING A NETWORK OF WATER APPLIANCES

REFERENCE TO RELATED APPLICATION

This application claims priority from U.S. Provisional Patent Application Ser. No. 60/613,516 filed on Sep. 28, 2004.

FIELD OF THE INVENTION

The invention relates to a system and method for controlling a network of appliances. In particular, the invention relates to a system and method for controlling a network of water appliances for safer and more efficient operation.

BACKGROUND OF THE INVENTION

Hot water is the leading cause of both scalds and hospital admissions for burns. This hot water includes tap water in sinks, bathtubs and showers. Each year approximately 3,800 injuries and 34 deaths occur in the home due to scalding from excessively hot tap water. The majority of these injuries involve the elderly and children under the age of five. It takes approximately 5 minutes to produce a partial-thickness burn when exposed to water having a temperature of 49° C. but it takes less than 3 seconds when the water temperature is at 63° C. Since infants, young children and the elderly may not be able to respond quickly to a situation involving contact with hot water, maintaining water temperature below a constant safe water temperature is essential for preventing scalds from tap water.

Serious burns and scalds require long and painful treatment. These injuries can result in permanent scarring, physical and emotional disability, and years of skin grafting operations. The very young and elderly are most at risk because they tend to have a slower reaction time and/or thinner skin.

The national building code currently allows a maximum water tank temperature of 60° C. The organization Safe Kids Canada has worked with the Canadian advisory committee on plumbing to develop a proposed amendment to the national building code and the national plumbing code. The proposal states a performance expectation limiting the temperature of hot water at plumbing fixtures to a maximum of 49° C.

Accordingly, there is a need for a system that can limit the temperature of water that is provided to a water appliance (i.e. water fixture). It would be beneficial if the system could provide such control to a network of water appliances with the capability of being retrofitted to existing plumbing systems as well as being integrated into new plumbing systems. In addition, it would be beneficial for the system to allow many users to use the water appliance according to their own personal preferences and provide a simple means for the user to use the water appliance according to their preferences. This is especially advantageous for the elderly who may have trouble operating a water appliance in the conventional manual fashion. This is also advantageous for elderly people who have memory or other cognitive problems which limits their ability to use the water appliance in a safe and effective manner. An indication of water condition is also beneficial since the user would then not have to test water using his/her bare skin which is an often-used method that can lead to injury.

SUMMARY OF THE INVENTION

The invention provides a method and system for controlling a network of appliances. In at least one embodiment, the method and system of the invention may be used as a dynamic water controller for controlling water appliances in a household, nursing home or other similar environment. The water appliances may include sinks, bathtubs, showers and the like. In this case, the appliance control system may be used to warn users of extremely hot water conditions to prevent injury to the users. This is beneficial for the handicapped, elderly and young children. For instance, the system could automatically shut down the water appliance when a maximum temperature is approaching. The system may further include an interactive graphical indicator for displaying water pressure and temperature along with a speaker for announcing a water attribute, like temperature, at a particular moment in time. Users may also be able to enter and save settings for using the water appliances for certain activities. The settings may include water pressure, water temperature, water run time, and the like. An example includes, for brushing teeth, choosing a setting of 2 minutes for letting the water run and using 26 lbs of pressure. Another example includes selecting a temperature of 42 degrees Celsius for taking a shower.

The appliance control system may also provide dynamic water control; for instance, dynamically controlling a water appliance so that the water pressure is in the range of 26 to 30 psi and adjusting the water flow if the pressure varies outside of this range. The system also enables prevention of water-related injuries because it allows a user to set the desired water temperature and pressure at different points of use in the house. The appliance control system may also provide IT features for seeing how much water is used and the amount of water that a particular user consumes. Accordingly, the appliance control system is beneficial for the user's health, saves energy, prevents tap water scalding and provides additional comfort at home.

The appliance control system can be easily retrofitted to existing inline faucets allowing for dynamic adjustment of water temperature and pressure from a common controller. The appliance control system may also be installed during the installation of the plumbing system while a home, and the like is being constructed.

In one aspect, at least one embodiment of the invention provides an appliance control system for controlling a network having a plurality of sets of appliances. The system comprises: a control station having a control unit for controlling the plurality of sets of appliances and a switch unit for routing control signals in the network, the control station being remotely located from the plurality of sets of appliances; a plurality of actuators connected to the control station for receiving control signals therefrom, the actuators being connected to and controlling the sets of appliances; a plurality of sensors, the sensors being connected to the sets of appliances for recording information therefrom and also connected to the control station for providing the recorded information to the control station; and a plurality of client stations, each client station being associated with a corresponding set of appliances and being connected to the switch unit, each client station being adapted for allowing a user to make requests to the control station for using the corresponding set of appliances.

In another aspect, at least one embodiment of the invention provides a method for controlling a network of several sets of water appliances, the method comprising:

(a) providing a control station including a control unit for centrally controlling the network and a switch unit for routing control signals in the network, the control station being remotely located from the sets of appliances;

(b) providing a plurality of client stations for the sets of water appliances, a given client station being associated with one of the sets of water appliances;

(c) providing actuators connected to the control station and the sets of water appliances for allowing control signals from the control station to control the sets of water appliances;

(d) providing sensors connected to the sets of water appliances and the control station for recording information about the sets of water appliances and providing the information to the control station; and, (e) providing several user accounts for one of the client stations and several settings for one of the user accounts.

In yet another aspect, at least one embodiment of the invention provides an appliance control system for controlling several sets of appliances. The system comprises a control station having a control unit for controlling the sets of appliances and a switch unit for routing control signals in the network, the control station being remotely located from the sets of appliances, wherein for each set of appliances, the system further includes a client station associated with each set of appliances and in communication with the control station. The client station is adapted for allowing a user to make requests to the control station for using at least one appliance in the associated set of appliances. The system further includes actuators connected to the control station and the sets of appliances for receiving control signals from the control station to control the sets of appliances; and sensors connected to the sets of appliances and the control station for recording information about at least one appliance in the sets of appliances and providing the information to the control station. The control unit is adapted for providing several user accounts for a given client station and several settings for each user account.

BRIEF DESCRIPTION OF THE DRAWINGS

For a better understanding of the invention and to show more clearly how it may be carried into effect, reference will now be made, by way of example only, to the accompanying drawings which show at least one exemplary embodiment of the invention and in which:

FIG. 4a is a flowchart for an exemplary embodiment of two control processes that may be run concurrently by the appliance control system;

FIG. 4b is a flowchart for an exemplary embodiment of a water flow request process;

FIG. 4c is a flowchart for an exemplary embodiment of an abort water flow request process;

FIG. 4d is a flowchart for an exemplary embodiment of a client data request process;

FIG. 4e is a flowchart for an exemplary embodiment of a user data request process;

DETAILED DESCRIPTION OF THE INVENTION

Figure 1:
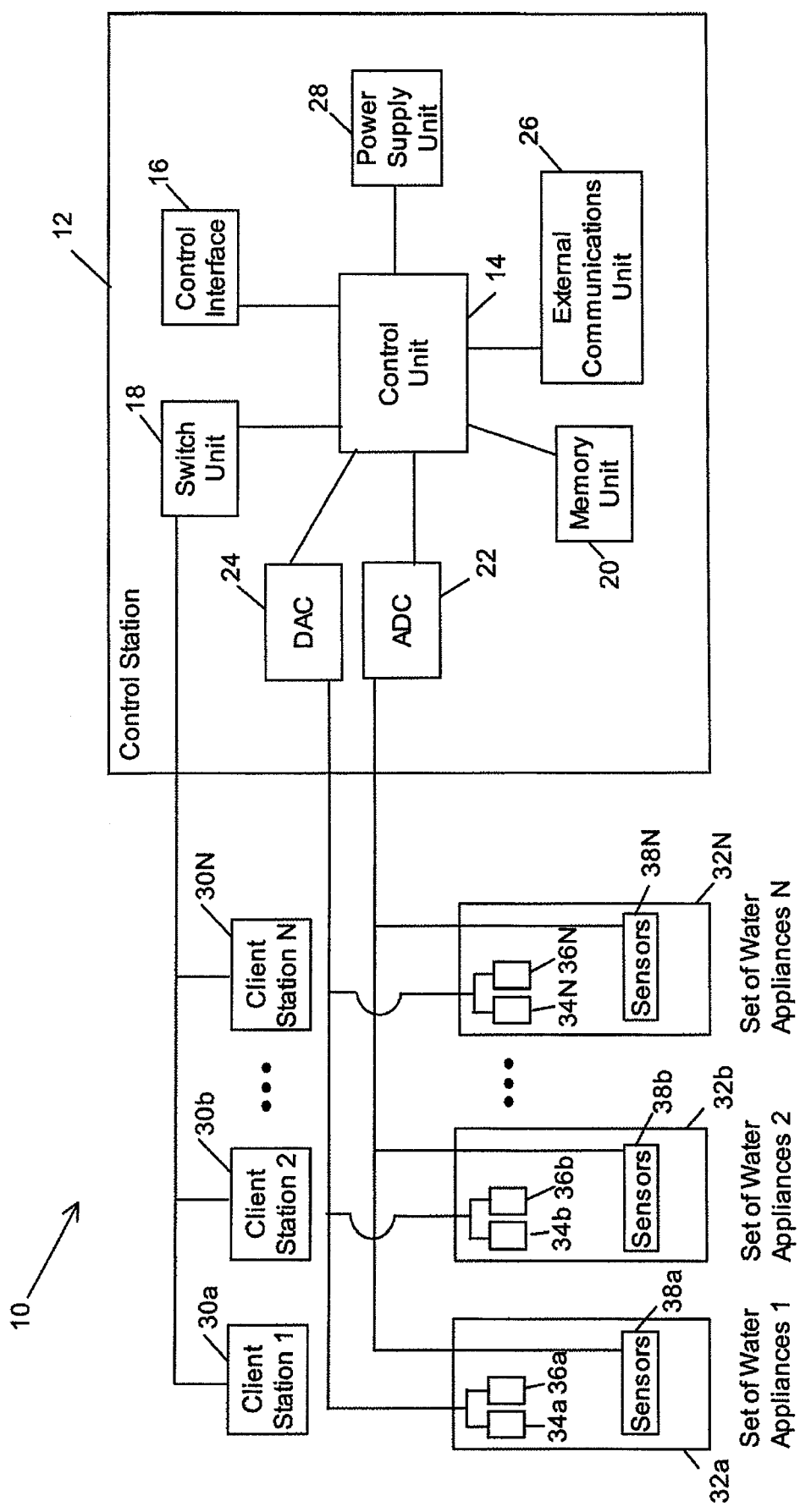
FIG. 1 is a block diagram of an exemplary embodiment of an appliance control system for controlling a network of appliances in accordance with the invention.

It will be appreciated that for simplicity and clarity of illustration, elements shown in the figures have not necessarily been drawn to scale. Further, where considered appropriate, reference numerals may be repeated among the figures to indicate corresponding or analogous elements. In addition, numerous specific details are set forth in order to provide a thorough understanding of the invention. However, it will be understood by those of ordinary skill in the art that the invention may be practiced without these specific details. In other instances, well-known methods, procedures and components have not been described in detail so as not to obscure the invention.

Referring now to FIG. 1, shown therein is a block diagram of an exemplary embodiment of an appliance control system 10 for controlling a network of appliances. In this example, the appliances are water appliances such as showers, sinks, bathtubs and the like that may be in a household, a hotel, a nursing home and the like. However, the invention is not limited to water appliances and may be applicable to other household appliances for which control settings may be applied, possibly in a remote fashion, such as a furnace, air conditioner, lights and the like.

The appliance control system 10 comprises a control station 12 having a control unit 14, a control interface 16, a switch unit 18, a memory unit 20, an analog to digital converter (ADC) 22, a digital to analog converter (DAC) 24, an optional external communications unit 26 and a power supply unit 28 connected as shown. The ADC 22 and the DAC 24 may more generally be referred to as data conversion circuitry. The control station 12 is connected to a plurality of client stations 30a, 30b to 30N via the switch unit 18. In one embodiment, the client stations 30a, 30b to 30N are associated with water appliances 32a, 32b to 32N that are controlled by the appliance control system 10. Generally speaking each of the client stations 30a, 30b to 30N is associated with a set of appliances; therefore, the water control system can be considered to control several sets of appliances (in some cases, a set of appliances may include one appliance). The appliance control system 10 further includes actuators 34a, 34b to 34N and 36a, 36b to 36N, and sensors 38a, 38b to 38N that are connected to the control station 12 via the DAC 24 and ADC 26 respectively. For example, the water appliance 32a may be a shower and the water appliance 32b may be a sink in a bathroom. There may be any number of client stations 30 and water appliances 32 in the appliance control system 10. For simplicity of description, the client stations 30a, 30b to 30N, the water appliances 32a, 32b to 32N, the actuators 34a, 34b to 34N and, 36a, 36b to 36N and the sensors 38a, 38b and 38N will now be referred to as client station 30, water appliance 32, actuators 34 and 36, and sensors 38.

The control unit 14 may be a microprocessor, microcontroller, digital signal processor, a server or the like. The control unit 14 monitors and controls all inputs and outputs of the appliance control system 10. The control interface 16 may include a display with a graphical user interface and a suitable input means such as a keyboard, a keypad, a mouse, and the like. The switch unit 18 may be any suitable electronics device that is capable of routing signals from the client station 30 to the control unit 14 and from the control unit 14 to the actuators 34 and 36. In one embodiment, the switch unit 18 may also provide a supply voltage to power the sensors 38 and the actuators 34 and 36. The memory unit 20 may be any suitable non-volatile memory such as ROM or flash memory. The memory unit 20 also includes a volatile component such as RAM, SRAM or the like for example. The control unit 14 accepts client specific data from the various client stations 30 and stores this data in the memory unit 20. The stored data may include water settings, administration data, calibration data, passwords and the like.

The ADC 22 and DAC 24 may be any suitable data converter that provide sufficient resolution and number of input/output channels. In one embodiment of the invention, SR9300 ADCs may be used for the ADC 22. There may be several ADCs 22 depending on the number of client stations 30. In one example, there may be two ADCs 22 that occupy two slots on the backplane of the control unit 14 when the control unit 14 is a server. The ADC 22 receives voltage signals from the sensors 38 that provides values for at least two features of the water appliance 32 such as water temperature, water flow rate, water pressure, etc. For instance, in the case of temperature, an input voltage range of 0 to 10V DC may represent a temperature range of 0 to 85° C. for the water provided by the water appliance 32.

In one embodiment of the invention, SR9400 DACs may be used for the DAC 24. More than one DAC 24 may be needed since each DAC 24 can interface with a finite number of client stations 30. For example, four DACs 24 may be installed in four slots of the backplane of the control unit 14. The DAC 24, via commands from the control unit 14, is used to drive control voltages to the actuators 34 and 36. In one exemplary case, a voltage range of 0 to 10 V DC may be provided to the actuators 34 and 36 via the DAC 24. In general, the control unit 14 is responsible for supplying the output to the actuators 34 and 36 of a given client station 30 either by request from the given client station 30 or for temperature adjustment when a particular client station 30 is online and operational.

The power supply unit 28 may be any suitable power unit. In one embodiment, the power supply unit 28 may be a 24 V DC power supply. The external communications unit 26 may be any suitable electronic communications device such as a parallel or serial port, an RS-232 port, a USB port, a modem (including a wireless modem), and the like. The client station 30 is custom built and provides a user interface to allow a user to control the operation of the water appliance 32. The client station 30 also includes a unique identifier so that the control unit 14 can identify the appropriate water appliance 32 to apply the control signals that are received from the client station 30.

The actuators 34 and 36 may be any suitable actuator that can be used to control the flow of water to the water appliance 32. The actuators 34 and 36 are preferably placed inline between the hot and cold water supply and the outlet conduit. The sensors 38 may be any suitable sensors that can provide an indication of the current state of the water being delivered to the water appliance 32 such as water temperature, or flow-rate. In one embodiment, the sensors 38 may include a thermistor that may be located on the outlet conduit of the hot and cold mixed water supply. In an alternative embodiment, both flow-rate and water-level sensors may be included in addition to temperature sensors. If the sensors 38 include a thermistor, such as a suitable thermistor developed by Thermometric, then the thermistor may be clipped-on to the discharge pipe of the water appliance to feed back information to the control unit 14. Previous designs use a traditional immersion probe which must be screwed into the discharge pipe, is not always reliable and may cause leakage problems because of the way in which it is attached to the discharge pipe. In another exemplary embodiment, one possible implementation involves placing similar sensors at multiple locations. For example, pressure sensors may be used at both the inlet and outlet of each water appliance thus allowing the flow rate to be calculated based on the differential of the measured values.

In one exemplary embodiment of the invention, the control unit 14 may be a server CPU such as the SR9150 processor, the switch unit 18 may be a Local Area Network (LAN) switch or an ethernet hub and the client stations 30 can be identified via a unique IP address.

In one embodiment, an administrator may interface with the control unit 14 via a telnet session, web browser session or via a more direct connection.

In one embodiment, the power supply unit 28 may comprise two 24 V DC power supplies to provide power to the server, the actuators 34 and 36, and the sensors 38. Two power supplies is preferable because, the current through the actuators 34 and 36 may fluctuate 1-2 A which may influence the readings obtained from the sensors 38 if the same power source is used for both of these elements. In addition, for safety purposes, fuses may be provided for the actuators 34 and 36 to isolate them from the rest of the network components.

In one embodiment, the ADC 22 and the DAC 24 may be implemented using an appropriate ADDA. For instance, software from Z World may be used so that the ADDA may communicate with the control unit 14.

In one embodiment, the actuators 34 and 36 may be implemented by a proportional control solenoid valve produced by Burkert Fluid Control System of Irvine, Calif., USA. These Burkert control valves have increased efficiency and high control accuracy. These valves are simply installed in line with the pipes that lead to the water appliance that is being controlled.

In one embodiment, there may be a power coupler (not shown) attached for each client station 30. The power coupler converts a normal ethernet cable into a cable which can provide a supply voltage (i.e. a power signal) from the control station 12 to the client station 30. In this case, the power coupler is connected between the client station 30 and the switch unit 18. Further, if a CAT5 4 twisted pair 24AWG ethernet cable is used to connect the client station 30 to the control station 12, then an unused pair of wires in the CAT5 cable may be used to carry the supply voltage.

In an alternative embodiment, the appliance control system 10 may also be able to provide IT features such as gathering usage data to allow the administrator to see how much water has been used, the amount of water that a particular user consumes, and the like. This information may be collected by the control unit 14 or the control unit 14 may be connected to a PC via the external communications unit 26 so that the PC can collect this information. The information can be used to ensure that water usage remains at an acceptable and economical level.

The above-noted IT features may be implemented by using an SNMP module or a suitable data acquisition software package, such as Labview 7.0, running on a PC. A correlation between hot and cold valve orifice opening/closing and time frame may be used to determine consumption. For instance, applying a formula based on gallons per minute (i.e. gpm) provides total water usage for each user on the network. For example, letting 10V DC=2 gpm per valve, 5V DC=1 gpm per valve, 1.5V DC=0.30 gpm, and multiplying the time duration (n) with the applied voltage to a valve provides the gallons of water that have gone through that particular valve if the water pressure is at 50 psi. If the water pressure is not at 50 psi, because there is another water appliance using water in the network, then this formula needs to be modified by the actual pressure of the water flow since more water has to flow in this situation to maintain the output pressure at the water appliance of interest.

Figure 2A:
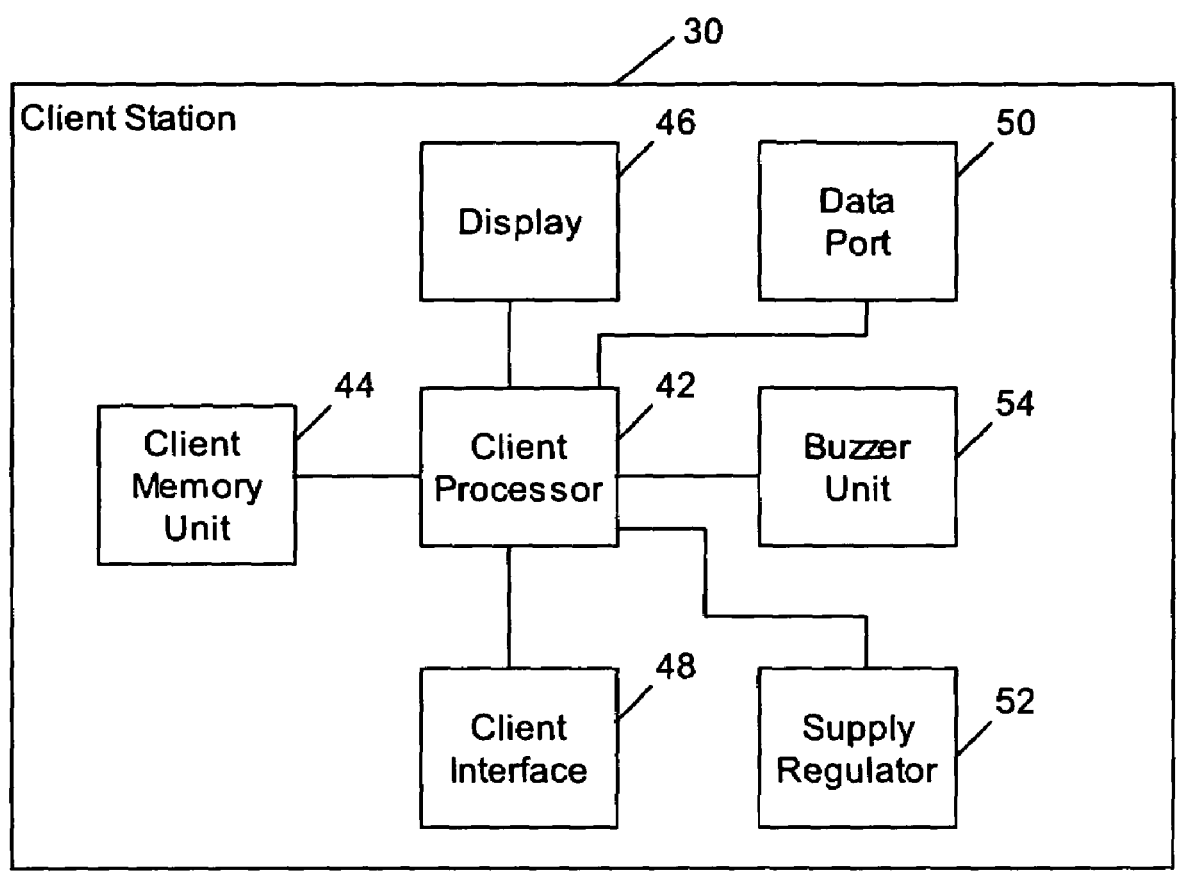
FIG. 2a is a block diagram of an exemplary embodiment of a client station.
Figure 2B:
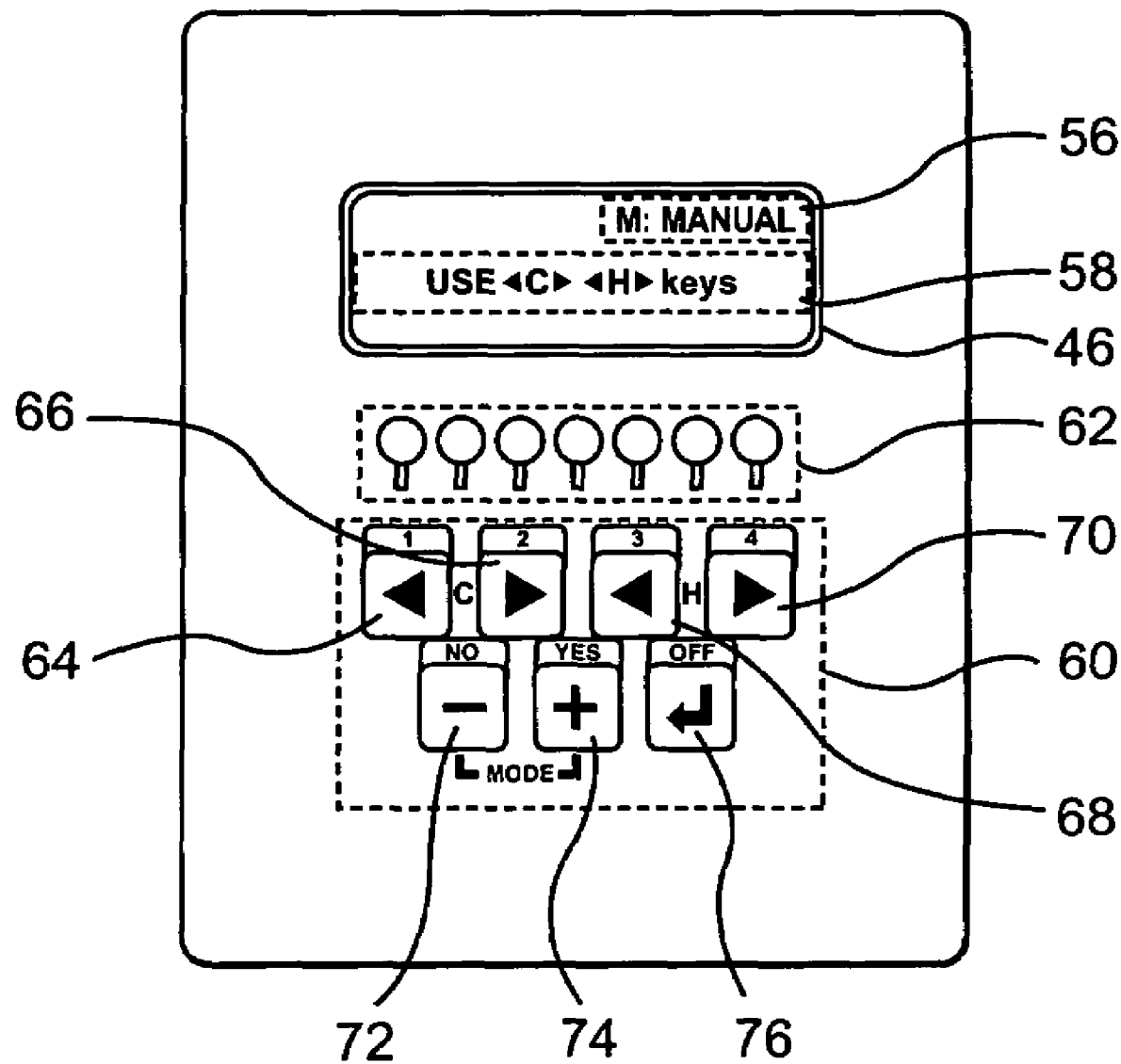
FIG. 2b is a front view of an exemplary physical embodiment of the client station.

Referring now to FIGS. 2a and 2b, shown therein is a block diagram for an exemplary embodiment of the components of a client station 30 and a front view of an exemplary embodiment of the exterior of the client station 30 respectively. The client station 30 is located near the water appliance that is controlled by the client station 30. For instance, the client station 30 may be mounted on the wall inside a bathroom to control a sink, bathtub or shower. In an alternative embodiment, the client station 30 may be constructed so that it is waterproof and placed within the shower/bath tub stall. In another alternative embodiment, the client station 30 may control more than one water appliance in the same bathroom. For instance, with one set of hot/cold actuators for the bathroom, a multi-port manifold, in this case a 3-port manifold, may be used to control three different water control appliances. The input to the manifold can be connected to the hot/cold actuators while the 3 output ports of the manifold each have an on/off controlled valve, such as a solenoid valve, under control of the control unit 14. Each output of the 3-port manifold may be connected to one of a sink, bathtub and shower. One of these may be on at any one time. Alternatively, two of them may be on by providing appropriate control signals although this may affect the output water pressure. The local user may specify which water appliance is to be turned on via the client interface on the client station. The power may be supplied directly to the actuators from the local 120V AC source.

The client station 30 includes a client processor 42, a client memory unit 44, a display 46, a client interface 48, a data port 50 and a supply regulator 52 connected as shown. The client station 30 may further include an optional buzzer 54. The client processor 42 may be any suitable microprocessor or a digital signal processor and the client memory unit 44 may be any suitable memory device. The display 46 may be an LCD that displays alphanumeric characters as well as symbols to indicate various conditions such as whether the water is hot or cold. Accordingly, this information may be displayed numerically or graphically. For instance, a symbol may be displayed on the display 46 to indicate whether the water is too hot and/or too cold. For this purpose, the client station 40 may also include the buzzer 54 which can provide an audible warning when certain hazardous conditions occur. In one embodiment, the client station may be implemented via an OP6800 MiniCom with the keys being modified for the functions described herein.

The display 46 may include several fields to provide information so that a local user can interface with the client station 30. For example, as exemplified in FIG. 2b, the display 46 may include a mode field 56 and a description field 58. In other embodiments, there may also be an information/performance field (not shown) to provide information on performance or other general information as well as text received in an email. The mode field 56 provides a description of the current mode of operation for the client station 30. The description field 58 provides an explanation of which keys to use and the effect of using those keys for the given mode of operation. For instance, as exemplified in FIG. 2b, given manual mode of operation, the description field 58 may tell the local user to use the arrow keys on either side of the cold indicator "C" on the keypad to increase or decrease the amount of cold water that is provided to the water appliance 32. The description field 58 may also tell the local user to use the arrow keys on either side of the hot indicator "H" to increase or decrease the amount of hot water that is provided to the water appliance 32.

The client interface 48 may be any suitable data input means. In one exemplary embodiment, the client interface 48 may include a keypad 60 having several touch keys 64 to 76 and an LED field 62 having several LEDs. The keypad 60 includes a cold decrease touch key 64 and a cold increase touch key 66 that can be used to decrease and increase, respectively, the amount of cold water that is provided to the water appliance 32. The keypad 60 further includes a hot decrease touch key 68 and a hot increase touch key 70 that can be used to decrease and increase, respectively, the amount of hot water that is provided to the water appliance 32. The touch keys 64 and 66 may be colored in light blue, or another suitable color, to indicate that these keys control the amount of cold water that is provided to the water appliance 32. The touch keys 68 and 70 may be colored in red, or another suitable color, to indicate that these keys control the amount of hot water that is provided to the water appliance.

It should be noted that the keys 64, 66, 68 and 70 may also be used to make numerical entries. For instance, the keys 64, 66, 68 and 70 may also represent the numbers 1 to 4, respectively, and can be used to enter passwords, select answers identified with numerals for multiple choice questions, provide numerical information, and the like.

The keypad 60 further includes mode keys 72 and 74 that may be used to provide YES and NO answers to various questions that are posed by the control station 12. The mode keys 72 and 74 may also be used to provide an increase or decrease, respectively, in the amount of a particular feature related to the operation of the water appliance 30, such as the duration of time for which water is provided to the water appliance 30. The mode keys 72 and 74 may also be used to select a particular local user or setting. For instance, the local user may be identified by a number from 1-9 and it is important for the local user to identify themselves because different settings may be programmed for different users. The mode keys 72 and 74 may also be pressed together to toggle between different modes of operation.

The keypad 60 further includes an OFF key 76 that is used to turn off the flow of water to the water appliance 32 and to return the client station 30 to an idle state. To start the flow of water to the water appliance 32, either of the touch keys 66 and 70 may be used. The OFF key 76 also provides an enter functionality that can be used by the local user to enter a selection or answer to a question. In general, the display 46 shows the user setting and two keys: the touch key that must be pressed in order to access the setting, and a second touch key that has to be pressed to make the water flow.

The LED field 62 may be used to provide information about the water that is being provided by the water appliance

32. Firstly, when the client station 30 is in operation, various LEDs in the LED field 62 may be lit. For instance, the LEDs may blink a certain color, such as yellow for example, when the control station 12 is adjusting the water provided by the water appliance 32 to a desired preset temperature. In a variation, the number of LEDs that are lit may increase as the temperature of the water reaches a desired preset temperature if one was set. The LEDs may also turn a constant color, such as green, when the desired temperature has been reached. This indicates that it is okay for the local user to use the water appliance 30. The LEDs may also blink another color to indicate that the temperature is too hot. For instance, if the water is above 60° C., then there is a danger of scalding so the LEDs may blink another appropriate color to indicate danger, such as red for example. The LEDs may also blink at another rate for different situations. In addition, when the appliance control system is operating in ADMIN mode, an administrator may program the red LED indicating scalding to turn on when a pre-set temperature threshold, which may be set in degrees Celsius or Fahrenheit, is reached.

The data port 50 provides a connection between the client station 30 and the control station 12. The data port 50 may be any suitable data connection means that interfaces with the control station 12. For instance, if the control unit 14 is a server and the switch unit 18 is a LAN switch or Ethernet hub then the data port 50 may be an Ethernet port. In this case, a CAT5 4 twisted pair 24AWG ethernet cable may be used to connect the client station 30 to the switch unit 18. In other embodiments, the data port 50 may be a USB port or an RS-232 port. In another alternative embodiment, a wireless link may connect the client station 30 to the control station 12. In this case, appropriate wireless components such as wireless transceivers may be used to facilitate the wireless interface between stations 12 and 30 as is commonly known by those skilled in the art.

The supply regulator 52 receives a supply voltage and provides this supply voltage to the various components of the client station 30, via the client processor 42, to power up the client station 30. The supply regulator 52 may also process the supply voltage, in ways that are commonly known to those skilled in the art, so that the supply voltage is suitable for use with the components of the client station 30. The supply regulator 52 may receive the supply voltage from the data port via the ethernet cable as described above. Alternatively, the supply regulator 52 may be directly connected to an electrical outlet to receive a supply voltage.

In an alternative embodiment, the appliance control system 10 may be interfaced to a computer system so that the appliance control system 10 may receive messages such as email messages which can be accessed by a local user. For instance, the appliance control system 10 may receive an email and then route this email to the appropriate client station 30. The client station 30 may then indicate that there is a received email message by providing a suitable indication, such as picture of an envelope, on the display 46. The local user may then use the client interface 48 to indicate that he/she wishes to read the email message. Security information may also be received from a security system in the building and displayed on the display 46.

In use, a user can interact with the appliance control system 10 in a number of different ways. In a first case, the user may interact directly with the client station 30 to control the water appliance 32 directly. In a second case, the user may interact with the control station 12 to control a water appliance 32 remotely. In both cases, the user may also set several control settings for the water appliance 32 in which, for each setting, the local user may specify values for certain parameters such as a maximum flow rate, maximum temperature and the like. The user may be able to save up to several number of settings such as 6 settings for example. In another case, different settings may be set depending on who uses the client station 30. This may be set by a "supervisory" user or an administrator at the control station 30 and then a local user who uses the client station 30 may enter an identification code with the client station 30 to be able to access control settings that may have been set just for that particular local user. The various modes of operation for the appliance control system 10 will now be described in further detail. In general, several user accounts can be provided for each client station and each user account may include several settings for a given user.

The appliance control system 10 may be configured to accommodate a certain number of client stations 30. Once an initial number of client stations 30 is selected then the appropriate amount of hardware may be added to the control station 12 such as several ADCs 22 and DACs 24, an appropriate number of client stations 30, actuators 34 and 36 and sensors 38, and a switch unit 18 that can accommodate all of the client stations 30. Advantageously, the appliance control system 10 is scaleable. Accordingly, if more client stations 30 are added to the appliance control system 10, more hardware components are added as needed. For instance, the embodiment which uses IP addresses easily allows for scaling the number of client stations, and associated hardware, in the appliance control system 10. When a client station is added to the network, an IP address is coded into the client station. Further, production servers may be equipped with DHCP capability with each client station receiving its IP address from the DHCP server when the client station is connected to the LAN switch. Also, the local AC voltage that is closest to the water appliance, when adapted properly, may be used to supply operating voltage to the actuators that are used with the water appliance. In a further alternative, wireless client stations can be wirelessly connected through a wireless network access point which would eliminate all direct cable runs to the LAN switch.

As an example, the appliance control system 10 may be initially configured to accommodate 20 client stations 30. Each of the client stations 30 is given a unique identification or address so that the control station 12 can contact an intended client station 30 to send control instructions or other information. The address also lets the control station 12 know which client station 30 is sending information. In the exemplary ethernet network implementation of the invention, each of the client stations 30 may be provided with a unique IP address and the control station 12 is also given a unique IP address. The IP address may be hard-coded via a client software program that is saved in the client memory unit 44 and loaded into the client processor 42 during operation. Alternatively, the IP address may be configured by a suitable hardware means on the client station 30 such as via a DIP-switch and the like.

Data for the operation and configuration of the appliance control system 10 is stored in the memory unit 20 of the control station 12. A data backup allows the data to persist even if supply power is removed from the appliance control system 10. The battery may be provided as part of the control unit 14. The appliance control system 10 may use passwords for allowing certain users to use the water appliances 30 and to configure the operation of the appliance control system 10. Accordingly, there may be several user passwords and administrator passwords. The user password may be a numerical value and can be related to the numbers that can be entered at the client station 30. For instance, in the example described herein, the local user may enter the numbers 1, 2, 3 or 4 and the user password may consist of a sufficient number of these numerals; for example six digits. There may be some more flexibility for the administrator password since a full keyboard may be used as part of the control interface 16. The administrator may customize the passwords as well as other settings for the appliance control system 10.

Prior to operation, default settings may be used which the administrator may change. For instance, the default setting may be the MANUAL MODE of operation and USER PASSWORDS may be set to ON. This means that local users must enter a password at the client station 30 in order to use the water appliance 32. Alternatively, if USER PASSWORDS is set to OFF, then anyone may use the water appliance 30 without having to enter a password. Another part of the default setting can be the type of water appliance (i.e. fixture) that the client station 30 is connected to. For instance, fixture=1 may indicate a bathtub, fixture=2 may indicate a sink and fixture=3 may indicate a shower. The control unit 14 can then treat each fixture type differently and use a different control algorithm in a dynamic state when the water pressure is lowered throughout the network of water appliances. Usually, showers are given the highest mean value. A water appliance will be given a higher priority depending on the effect of a change in water pressure or water temperature for a local user when another water appliance suddenly turns on. This is true because there is one water source that is providing water to each water appliance that is on. Accordingly, in some cases, some water appliances may not be allowed to turn on if there is already too much of a load on the network and some high priority water appliances are already on.

The water control system 10 includes several modes of operation such as a USER mode, a PROGRAM mode, a MANUAL mode and an ADMIN mode. Appropriate graphics, information and instructions may be displayed on both the control interface 16, which may include a computer monitor and the like, and the display 46 of the client station 30.

The USER mode allows local users to log in and select a pre-configured appliance setting such as the amount of hot and cold water that is to be used and the amount of time for which the water appliance 32 should be on. Controlling the amount of hot and cold water that is provided to the water appliance 30 also has an effect on the amount of water pressure delivered for the water appliance 30 since mixed hot and cold water creates a pressure which becomes an attribute of temperature. For example, increasing the DC control signal to the actuator that controls the amount of hot water provided to the water appliance will increase temperature and pressure (i.e. 0 V DC is equivalent to 0 psi and 10 V DC is equivalent to 50 psi). The USER mode only responds to the information that has been entered into the system while in PROGRAM mode.

The PROGRAM mode allows existing local users or new local users to configure a number of control settings for the water appliance 32 as well as set a password. The MANUAL mode allows the local user to operate the water appliance 30 without having to enter a password or choose a setting. In this mode, the local user may simply control the water appliance via a "digital interface" whereas conventionally people interact with water appliances via an analog means; i.e. by turning knobs or lifting and partially rotating levers. The ADMIN mode allows the administrator to configure settings for the appliance control system 10. For instance, the administrator may select settings for a particular client station 30 such as whether MANUAL mode is available, the amount of water that can be used, etc. The ADMIN mode is accessed with an appropriate password.

When a new water appliance and associated client station is first commissioned into the network, an administrator may use the ADMIN mode to set the different attributes for that station such as an identification number, a mean priority number and the like. PROGRAM mode may then be used by the users of the client station to enter programmed settings that are stored in the memory unit 20 to be used and recalled on demand. The USER mode can be used for the day-to-day usual operating mode of the new client station that provides the user of the new client station to use single digit entry, in one example, to recall a preconfigured setting from the control station 12. MANUAL mode allows the user to directly control the new water appliance from the client station to turn water flow on and off.

Figure 3A:
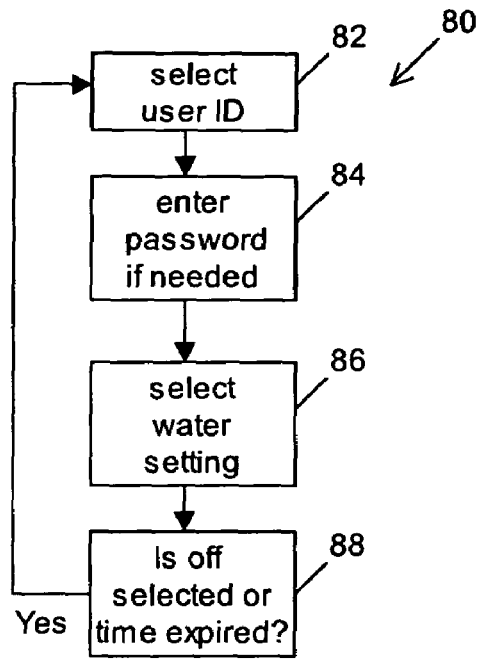
FIG. 3a is a flowchart of an exemplary process that may be followed when the appliance control system is operating in USER mode.

Referring now to FIG. 3a, shown therein is a flowchart of some exemplary steps that may be followed in a user mode process 80 when the appliance control system 10 is operating in USER mode. In step 82, the local user can select a user ID using the −/+ touch keys 72 and 74 or the touch keys 64 to 70 and then the touch key 76. In step 84, the local user may then have to enter a password, if it is required, using the touch keys 64 to 70 and then the touch key 76. In step 86, the local user can then select a water setting by using touch keys 64 to 70 or touch keys 72 and 74 and then the touch key 76. In step 88, after OFF has been pressed or the time expires if a certain duration was selected for providing water to the water appliance 32, the process 80 returns to step 82.

Figure 3B:
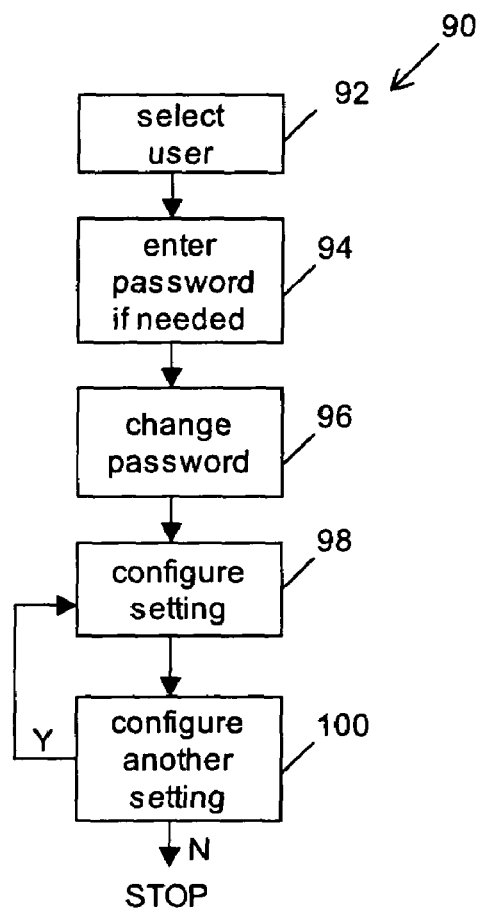
FIG. 3b is a flowchart of an exemplary process that may be followed when the appliance control system is operating in PROGRAM mode.

Referring now to FIG. 3b, shown therein is a flowchart of some exemplary steps that are followed in a program mode process 90 when the appliance control system 10 is operating in PROGRAM mode. In step 92, the local user can select a user ID as described previously. In step 94, the local user may then have to enter a password, if it is required, as described previously. In step 96, the local user can change their password. In step 98, the local user can configure a water setting by selecting a water setting number, and adjusting the hot and cold water flows until desired levels are reached using the touch keys 64 to 70, and then accepting the water flow for the current setting by using the touch key 76. The local user may then select the amount of time for which water should be provided to the water appliance 30 by using the touch keys 72 and 74 and then selecting the touch key 76. In step 100, the local user may configure another water setting in which case the process 90 goes to step 98. Various water settings may be made for each local user based on what the local user is doing. For instance, given a water sink appliance, the local user may select different settings for shaving, washing their face, brushing their teeth, etc.

For instance, in PROGRAM mode, for a family that includes a father and mother with 4 children named John, Judy, Bill and Kim, the main bathroom sink could be configured with the following: Father (local user 1), Mother (local user 2), John (local user 3), Judy (local user 4), Bill (local user 5) and Kim (local user 6). The father may have three user settings to record water temperature and pressure for various activities. For instance, setting 1 may be used to brush teeth using moderately cold water for 2 minutes (this may translate to a control voltage of 1 to 3 V DC on the appropriate actuator). Setting 2 may be used to wash hands using a combination of moderately hot and cold water for 20 seconds. Setting 3 may be used to shave using maximum hot water to half fill the sink for 10 seconds. The Mother and children could make similar settings according to their preferences. When the Father goes to the bathroom to brush his teeth, the display on the client station 30 will ask him to select a user number. Once the Father enters his user number, the client station 30 will then ask him to enter the desired user setting. If the Father enters setting 1, the cold water will run for 2 minutes and then turn off.

Figure 3C:
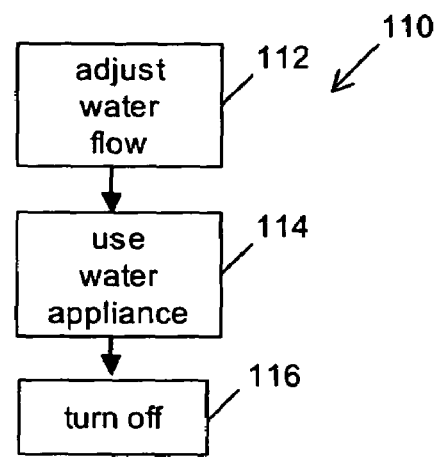
FIG. 3c is a flowchart of an exemplary process that may be followed when the appliance control system is operating in MANUAL mode.

Referring now to FIG. 3c, shown therein is a flowchart of some exemplary steps that may be followed in a MANUAL mode process 110 when the appliance control system 10 is operating in MANUAL mode. In step 112, the local user can turn on the water appliance 32 and adjust the water settings using the touch keys 64 to 70. In step 114, the local user uses the water appliance for its intended purpose. In step 116, the local user then turns off the water appliance by using touch key 76.

Figure 3D:
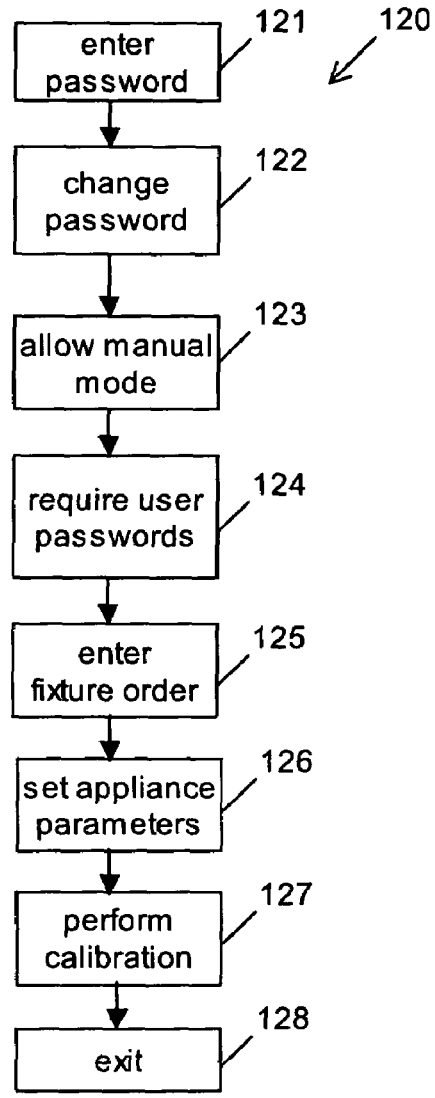
FIG. 3d is a flowchart of an exemplary process that may be followed when the appliance control system is operating in ADMIN mode.

Referring now to FIG. 3d, shown therein is a flowchart of some exemplary steps that may be followed in an ADMIN mode process 120 when the appliance control system 10 is operating in ADMIN mode. In step 121, the administrator enters a password as described previously. It should be noted that if there is more than one administrator then the first step may also include selecting an administrator ID. In step 122, the administrator may change their password. In step 123, the administrator may allow manual mode for a particular water appliance 30 or may allow manual mode on a global basis (i.e. for all water appliances in the appliance control system 10). In step 124, the administrator may choose whether the local user requires a password to operate a particular water appliance 30. The administrator may also decide that user passwords are required on a global basis. In step 125, the administrator enters a fixture order. The order provides the control unit 14 with a priority order in terms of which water fixture provides first service in case of contention in the dynamic process of water adjustment. For instance, the order may be: 1) bathtub, 2) sink 3) shower and 4) other. Providing the fixture order or priority control feature is one way of ensuring personal safety for someone using a water appliance associated with a given client station. For example, a person taking a shower may be given priority over a person washing their hands in a basin. The priority control feature may be implemented based on a number plan from 1-4 with 4 being the highest priority for an example with four water fixtures associated with a client station. This priority control feature can be executed at msec speeds with a focus on the safety of the water appliance users.

In step 126, the administrator has the ability to set many parameters for the appliance control system such as the maximum hot water setting, the maximum cold water setting, the maximum number of settings available to a local user, the range for the time duration setting (one example is 0 to infinite), the maximum number of local users per client station (for example 10), and Comm retries (this means that an error occurred in the system 10 during communication but the control unit 14 will try to complete the message a certain number of times). In step 127, the administrator may then perform calibration on a given water appliance to calibrate the readings that are provided by the sensors associated with the given water appliance (an exemplary calibration method is described below). The administrator can then exit the administrator process 120 in step 128.

The appliance control system 10 may provide calibration of water temperature at each water appliance, independently of each other using a built in software routine to offset pipe distribution length. The local user enters the desired water temperature at the client station in degrees Celsius. The calibration program which is run as part of system integration/initialization then computes an adjusted desired water temperature so that the actual water temperature at the water appliance will be similar to that desired by the local user. For instance, some water appliances may be 300 feet from the water source and so there will be some fluctuation in the temperature of the water once it reaches the water appliance. This can be taken care of by calibrating the appliance control system 10 in ADMIN mode as follows. First the control station sends control values to the actuators of the client station to provide water at a first calibration temperature at the client station such as 25° C. A person at the water appliance can then see the actual temperature, measured by a temperature probe attached to the outlet of the water appliance near the thermistor. The person then uses the manual hot and cold keys on the client interface 48 to drive the actuators so that the actual water temperature at the water appliance is, or is acceptably close to, the first calibration value. The person then informs the control station 12 that the first calibration temperature has been reached. The next step is that the control station 12 drives one of the actuators to its maximum value which provides a second calibration temperature that is measured by the temperature probe. This second calibration temperature is then sent by the person to the control station 12 and stored. This process may also be automated by having the control station 12 directly communicate with the temperature probe. The advantage of this feature is that pipe length and diameter is not a consideration.

Another way in which calibration may be done is to have the control unit 14 run a calibration program in the following fashion: cold water is first run and the temperature of the cold water is measured at the water appliance via the corresponding sensor. The measured temperature in degrees Celsius is then stored in the memory unit 20 of the control unit 14. The hot water is then run and the temperature of the hot water is measured. The second measured temperature in degrees Celsius is then stored in the memory unit 20 of the control unit 14. This calibration may be done in ADMIN mode. By applying many different control signals to the actuators and recording the actual temperature, the control unit 14 may construct a look-up table that is stored in the memory unit 20 and used to provide a desired temperature at a particular water appliance when requested by a local user.

A network control program operates on the control unit 14 to control the operation of the appliance control system 10. Referring now to FIG. 4a, shown therein is a flowchart for an exemplary embodiment of an information retrieval process 130 and a message retrieval process 140 that may run concurrently on the control unit 14. In step 132 of the information retrieval process 130, the control program reads all of the data from the sensors 38. In step 134, the control program converts the measured data into the appropriate units. For instance, if values related to temperature are provided by the sensors 38, then the raw voltage values are preferably converted to degrees Celsius. In other embodiments, other types of data may be read depending on the type of sensors that are used. The information may then be stored in step 136. This is one way in which the control unit 14 calibrates the control signals provided to the actuators when various water appliances are on in the system 10. This allows the control unit 14 to simulate different load cases in which different water appliances are on at the same time and compensate by applying appropriate control signals to the actuators. In the "wired" server-based embodiment, the Control unit 14 has the ability to balance the entire network of water appliances mainly due to the speed of the networked connections (i.e. ethernet connections) and processor speed at each client station and by monitoring each pre-set thermistor value at suitable programmable rate, such as 500 msec, and then nudging the different actuators that require change to keep within their user preset limits.

In step 142 of the message retrieval process 140, the control program checks to see if a client message has been received from one of the client stations 30. If a client message has not been received, then the process 140 remains in step 142. However, if a client message has been received, then the process 140 moves to step 144 in which the client message is processed. A particular process is then followed depending on the type of client message. The various types of client messages may include water flow request, abort water flow request, configure a water setting, etc. While the message is being handled in step 144, the process 140 still checks to see if messages are received from other client stations. The sensors are wired directly to the ADCs and so collisions for data measurements will not occur, nor will collisions for control signals since the actuators are wired directly to the DACs. If there is a collision based on more than one client station communicating with the control station, then according to the network protocol, the messages may be retransmitted a certain number of times.

Referring now to FIG. 4b, shown therein is a flowchart for an exemplary embodiment of a water flow request process 150. In this case, one of the local users requests water flow for a water appliance via the appropriate client station in step 152. In step 154, the control program calculates the appropriate control voltages for the corresponding hot and cold water valve actuators and sends the control signals to the actuators. In step 156, the control program sends an acknowledgement to the client station.

Referring now to FIG. 4c, shown therein is a flowchart for an exemplary embodiment of an abort water flow request process 160. In this case, one of the local users originally requested water flow for a water appliance and then changed their mind. Consequently, an abort water flow request message is sent via the appropriate client station in step 162. In step 164, the control program sends control signals to the actuators to close the hot and cold water valves for the water appliance of interest. In step 166, the control program sets the client status to OFFLINE. In step 168, the control program sends an acknowledgement to the client station.

Referring now to FIG. 4d, shown therein is a flowchart for an exemplary embodiment of a client data request process 170. In this case, one of the local users requests information about a water appliance. The information may be water temperature, water flow rate, water pressure, water run time, and the like. The request may also be more general; for instance, inquiring about water consumption for the water appliance over a set period or for the entire network of water appliances for a certain time period. In step 172, the client makes a request for temperature data, in this example. In step 174, the control program responds with the requested information which the client station displays to the local user.

Referring now to FIG. 4e, shown therein is a flowchart for an exemplary embodiment of a user data request process 180. In this case, one of the local users requests information regarding information about the user that is stored in the system 10. For instance, this information may include how many settings have been programmed for the user, how much water has been used by the user, etc. In step 182, the user makes a request for user data. In step 184, the control program responds with the requested user data which the client station displays to the user.

Figure 4F:
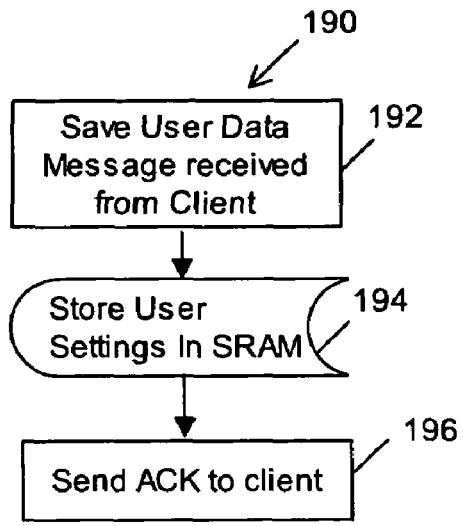
FIG. 4f is a flowchart for an exemplary embodiment of a save user data process.

Referring now to FIG. 4f, shown therein is a flowchart for an exemplary embodiment of a save user data process 190. In this case, some of the information that is entered by the local users is saved in the memory unit 20. In step 192, the user sends user data to the control unit 14 which is to be saved. In step 194, the control program stores the user settings. In step 196, the control program sends an acknowledgement to the client station.

Figure 4G:
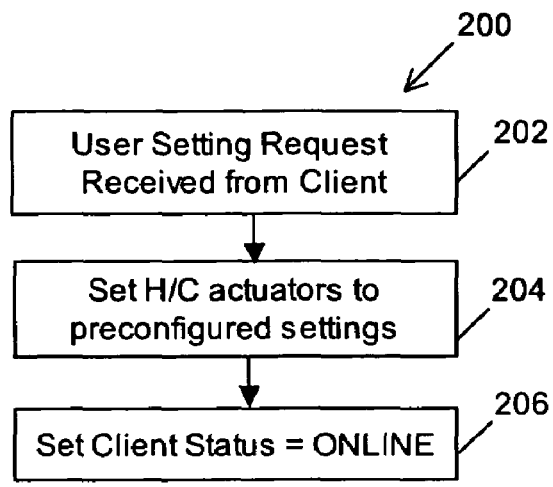
FIG. 4g is a flowchart for an exemplary embodiment of a user setting request process.

Referring now to FIG. 4g, shown therein is a flowchart for an exemplary embodiment of a user setting request process 200. In step 202, the control unit 14 receives a request from a client station 30 to select a particular user setting. In step 204, the control program provides control signals to the hot and cold water valve actuators to ensure that the valves are set to the preconfigured settings. In step 206, the program sets the client status to ONLINE to indicate that the corresponding water appliance is on.

Figure 4H:
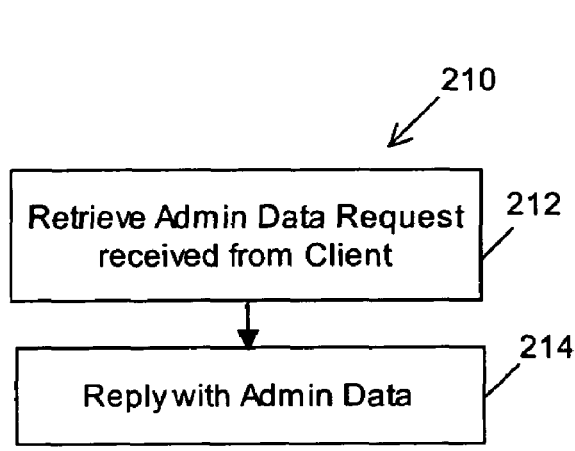
FIG. 4h is a flowchart for an exemplary embodiment of an admin data retrieval request process.

Referring now to FIG. 4h, shown therein is a flowchart for an exemplary embodiment of an admin data retrieval request process 210. In step 212, the control unit 14 receives a request from a client station 30 to retrieve administration data. In step 214, the control program provides the administration data to the client station. This process may occur in which a local user programs some values for some settings and then requests the administrator to provide these values so that the local user can double-check that the correct values were entered for the settings.

Figure 4I:
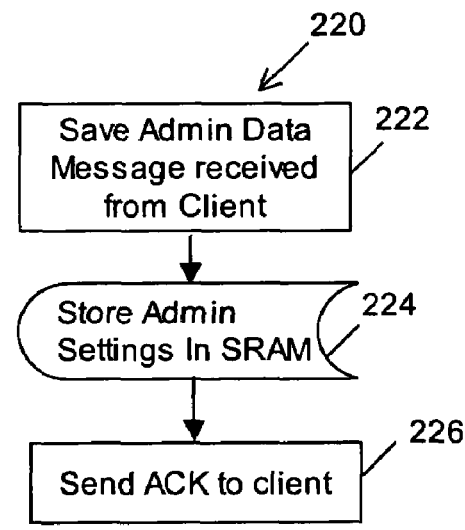
FIG. 4i is a flowchart for an exemplary embodiment of a save admin data process.

Referring now to FIG. 4i, shown therein is a flowchart for an exemplary embodiment of a save admin data process 220. In step 222, the control unit 14 receives a message to save administration data from a client station. In step 224, the control program stores the administration data in the memory unit 20. In step 226, the control program sends an acknowledgement to the client station.

Figure 4J:
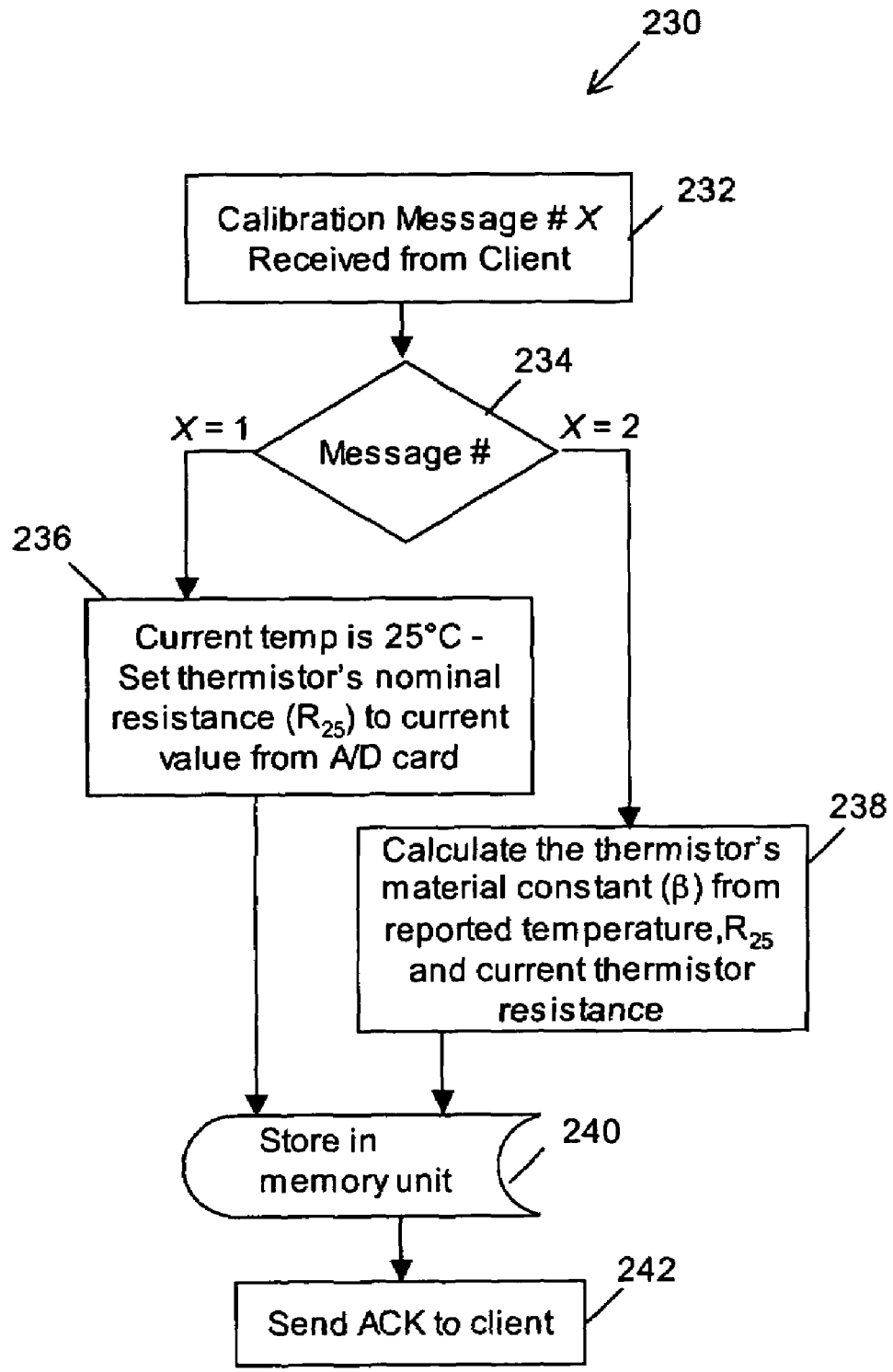
FIG. 4j is a flowchart for an exemplary embodiment of a calibration process.

Referring now to FIG. 4j, shown therein is a flowchart for an exemplary embodiment of a calibration process 230. In step 232, the control unit 14 receives a calibration request from a client station in which the client provides a first data point generically referred to as X which represents the number of data points sent to the control program during calibration (i.e. on the first transmission X is 1, on the next transmission X is 2). In step 236, the process 230 determines whether the data point X is the first or second data point. If the data point X is the first data point then the process moves to step 236 in which it is assumed that the sensor is sensing room temperature (since no water has been flowing) and the process 230 sets a value for a parameter which represents the nominal thermistor resistance $R_{25}$ (it is assumed that a thermistor is used for the temperature sensor) and stores the value for the parameter $R_{25}$ in the memory unit 20 in step 240. This value is the actual value provided to the ADC 22. However, if it is determined that the data point X is the second data point in step 234, then the process 230 moves to step 238 in which the process 230 calculates the thermistor's material constant $\beta$ from the temperature reported by the thermistor, the thermistor's nominal resistance $R_{25}$, and the current thermistor resistance value. The thermistor's material constant $\beta$ is then stored in the memory unit 20 in step 240. For an NTC (Negative Temperature Coefficient) thermistor, the current temperature (T) can be calculated according to equation 1:

$$T = 298 \cdot \beta / (298 \cdot \ln(R_t/R_{25}) + \beta) - 273 \tag{1}$$

in which $\beta$ is the thermistor's material constant in Kelvins, $R_t$ is the current thermistor resistance in Ohms, and $R_{25}$ is the thermistor's nominal resistance at 25° C. Rearranging equation 1 provides a way to obtain $\beta$ according to equation 2.

$$\beta = ((T+273) \cdot (298 \cdot \ln(R_t/R_{25}))/(25-T) \tag{2}$$

An acknowledgement may then be sent to the client station 30 in step 242 to signify that the control unit 14 has calibrated the temperature sensor associated with the client station 30.

Figure 4K:
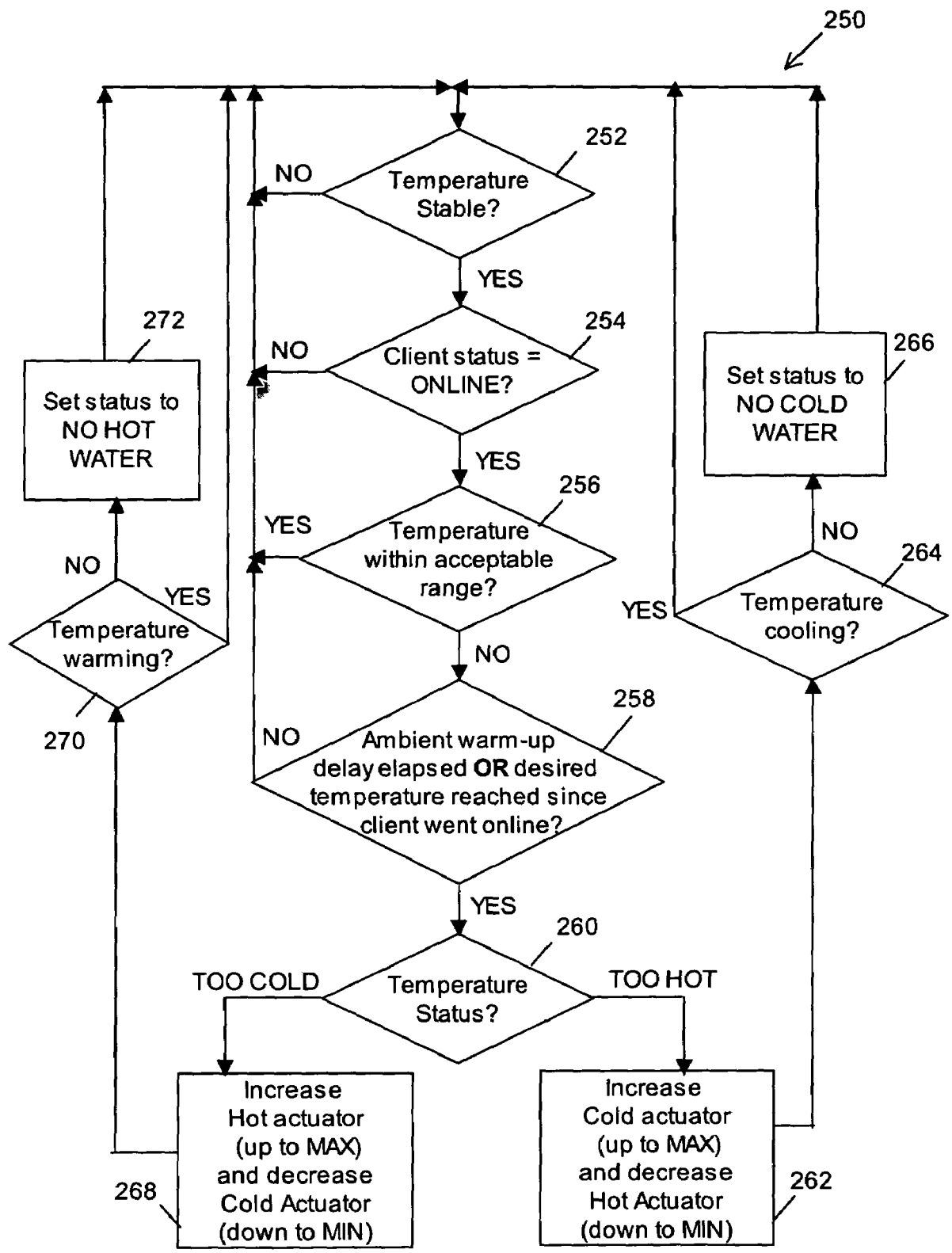
FIG. 4k is a flowchart for an exemplary embodiment of a temperature monitoring process; and, FIG. 5 is a flowchart of an alternative exemplary process that may be followed when the appliance control system includes a proximity sensor and is operating in ADMIN mode.

Referring now to FIG. 4k, shown therein is a flowchart for an exemplary embodiment of a temperature monitoring process 250. In step 252, the process 250 determines whether the temperature reading is stable for a particular water appliance. If the process 250 determines that the temperature is stable, then the process 250 moves to step 254, where it determines whether the particular client station is online. If the client station is online, then the process moves to step 256 where it determines whether the temperature is within an acceptable range with respect to the desired water temperature that is requested by the local user. In step 258, the process 250 determines whether the desired temperature has been reached for this water appliance or whether the temperature sensor has "warmed-up" for this water appliance; "warmed-up" means whether the temperature sensor is at room temperature. A delay may be used to provide the temperature sensor with enough time to stabilize to the water temperature. If either of these events are true, then the process 250 moves to step 260 in which the process 250 determines what the temperature status is which is the amount of deviation of the temperature of the water from the desired temperature. If the temperature is too hot, the process 250 moves to step 262 in which the control program directs the cold actuator to open the valve in the cold water pipe up to a MAX setting if needed and decrease the size of the valve opening in the hot water pipe down to a MIN setting if needed. The process 250 then moves to step 264 in which the process 250 monitors the water temperature to see if it is decreasing. If the water temperature is decreasing, then the process 250 moves to step 252. However, if the water temperature is not decreasing, after a suitable elapsed time such as the elapsed time to provide 10 to 20 control values to the actuator, the process 250 moves to step 266 in which the process 250 sets the status for the client station 30 to NO COLD WATER and the current user setting is then aborted. The process 250 then moves to step 252.

Alternatively, if the process 250 determined that the temperature is too cold in step 260, then the process 250 moves to step 268 in which the control program directs the hot water actuator to open the valve in the hot water pipe up to a MAX setting if needed and decrease the size of the valve opening in the cold water pipe down to a MIN setting if needed. The process 250 then moves to step 270 in which the process 250 monitors the water temperature to see if it is increasing. If the water temperature is increasing, then the process 250 moves to step 252. However, if the water temperature is not increasing, after a suitable elapsed time such as the elapsed time to provide 10 to 20 control values to the actuator, the process 250 moves to step 272 in which the process 250 sets the status for the client station 30 to NO HOT WATER and the current user setting is then aborted. The process 250 then moves to step 252.

In process 250, priority is given to the client station that has a water appliance that is on that is given the highest priority number if more than one client station experiences a change in temperature. This is important since, a priority number per client station can be devised and used to address dynamic water supply when water is supplied from a common hot/cold water supply. This does not impact on the safety of the system 10 since control signals can be provided on the order of milliseconds to provide control in real-time.

The temperature monitoring and adjustment is preferably continually performed by the control unit 14 for each operational client station based on input from the sensors associated with the operational client stations. The control unit 14 takes the appropriate action based on the circumstances; one example of which was shown in FIG. 4k. The current temperature may be calculated from equation 1 provided above for NTC thermistors. The control unit 14 may use the temperature information to provide status codes to one of the client stations as needed and/or to take necessary actions (as exemplified in FIG. 4k). Some exemplary status codes include:

OFFLINE: The client station has no running water.

OK: The water temperature is stable and within the required range (i.e. the programmed value +/− an allowed variance) for the user's setting.

PENDING: The water temperature is not within the required range. Adjustments to the water flow may be made at this time. During the PENDING state, adjustments to the hot/cold valves may be made by the control unit 14 to attempt to return the water temperature to the required value as exemplified in FIG. 4k.

WARNING: The water temperature has reached a dangerous level and scalding is a possibility.

NO HOT WATER: Attempts to increase the water temperature are having no effect, and it is possible that the hot water supply has been cut off.

NO COLD WATER: Attempts to decrease the water temperature are having no effect, and it is possible that the cold water supply has been cut off.

In another alternative embodiment of the appliance control system 10, the sensors 38a . . . 38N now include a proximity sensor that may be preferably installed near the water output of a particular water appliance. The proximity sensor allows a user at the client station to wave his/her hand close to the water appliance to activate the water appliance for a particular setting. This allows a user to activate a given water appliance associated with a given client station in a non-touch fashion. The control unit 14 is adapted to store operational parameters for operating the given water appliance when activated in a non-touch fashion. The option to use a proximity sensor and the particular setting that it activates can be controlled from the control unit 14 as explained below. Using the proximity sensor to activate a particular setting can be advantageous for certain situations such as for medical personnel who need to vigorously wash their hands to remove any possible germs. In this case, the medical personnel do not need to touch the water appliance, thereby preventing the spread of germs, and can have the water appliance preprogrammed to provide a higher water pressure for more effectively cleaning his/her hands.

Figure 5:
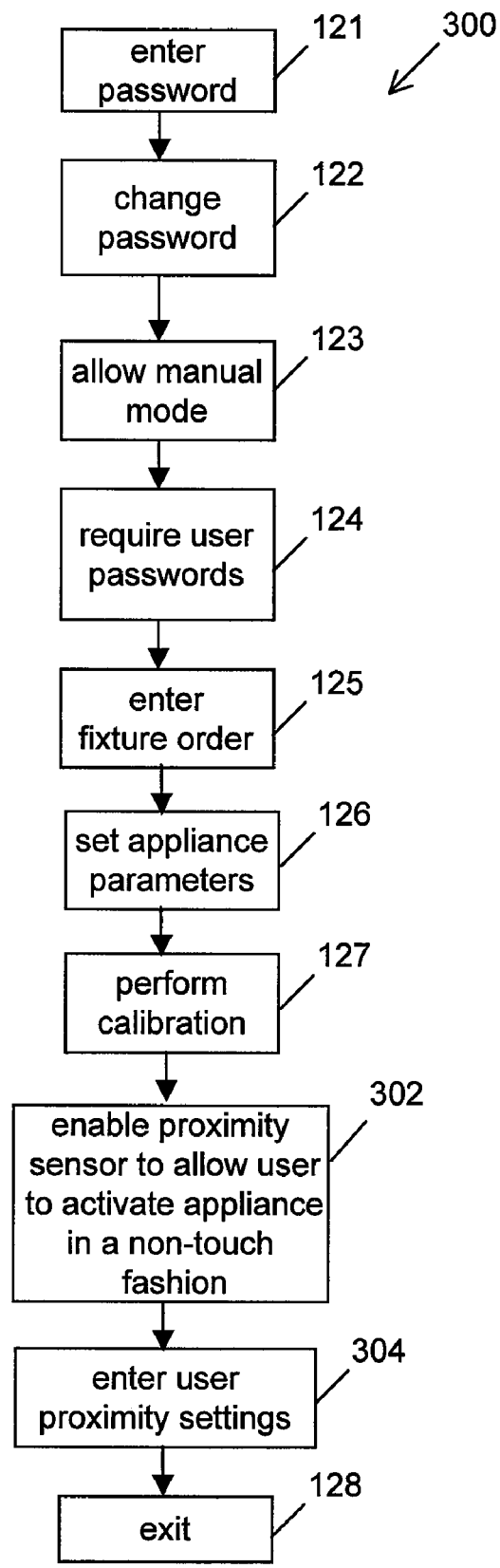

Referring now to FIG. 5, shown therein is a flowchart of an alternative exemplary process 300 that may be followed when the appliance control system 10 includes a proximity sensor and is operating in ADMIN mode. Process 300 is similar to process 120. However, process 300 accommodates the use of proximity sensors. Step 302 of process 300 allows the administrator to select whether proximity sensors are enabled for a given client station. Step 304 then allows the administrator to set proximity settings for the users who use the given client station. For instance, the administrator can set values for water parameters when the proximity sensor is enabled such as water temperature, water pressure and the like. These settings may also be associated with a particular user id. The user may be able to identify themselves through non-touch means such as voice activation for instance so that their settings are applied to the water once they interact with the proximity sensor.

A simulation of the operation of the appliance control system 10 was performed. To simulate the I/O structure, two potentiometers were tied to a 9V battery and used to mimic the temperature inputs for first and second client stations, and a set of two DC voltage meters were used to read the values of the control signals that would have been given to the valve actuators for the first and second client stations. In addition, the programming port on the server CPU was connected to a PC to give additional textual output showing all communications between the client stations and the server.

Four tests were performed. Test #1 was done to determine if a water appliance 32 could be controlled remotely in which a water temperature and water running time was set. Test #2 was done to determine if a water appliance 32 could be dynamically adjusted. Test #3 was done to determine if the system 10 can send and receive data to and from more than one client station 30 without any collision or contention. Test #4 was done to determine if the system 10 displays a warning message and turns off a water appliance 32 if the water at that water appliance gets too hot.

In Test #1, an administrator configured the first client station to operate with a 50% cold water flow rate and a 50% hot water flow rate for a duration of 30 seconds. The user setting was initiated on the first client station by pressing the appropriate touch key that selected setting #1 and then pressing the enter touch key 76. The voltage meters then each read 5 V DC which corresponds to the control voltages that are provided to each of the hot and cold valve actuators. This provides a flow rate of 50% for the cold and hot water since the voltage range of the control signal that is provided to the hot and cold valve actuators is 0 to 10 V DC. Accordingly, 10 V DC is equivalent to maximum valve flow rate and 0 V DC is equivalent to no flow in this exemplary test.

Once the water began to flow, the first potentiometer was at its lowest setting which corresponds to a temperature reading of 1° C. This temperature reading was shown on the display 46 of the first client station. The LED field 62 started blinking yellow to indicate that the control system 10 was adjusting the water to the first water appliance. The first potentiometer was then slowly increased until 15° C. was shown on the display 46 of the first client station. After a few seconds, the LED field 62 was no longer blinking yellow and solid green was displayed along with a message that "water is OK". Approximately thirty seconds after the green light was displayed, the first client station turned off and the voltage meters dropped to 0 V. All control voltages to the actuators were then set to 0V DC. Accordingly, in one embodiment, the run duration for the water is measured from the time that the water reaches the desired temperature.

In Test #2, an administrator configured a first setting for a first local user on the first client station to have an infinite time duration while the flow rates remained the same as they were from Test #1. The first local user logged into the first client station and initiated the first setting. The voltage meters both then indicated a reading of 5 V DC for the hot and cold flow rate valve actuators. The first potentiometer was initially at the lowest setting and the temperature reading on the display 46 of the first client station was 1° C. The LED field 62 started blinking yellow to indicate that the control system 10 was adjusting the water to the water appliance. The first potentiometer was then slowly increased until 10° C. was shown on the display 46 of the first client station. After a few seconds, the voltage meters began to swing, with the voltage meter representing the cold water flow valve actuator decreasing and the voltage meter representing the hot water flow valve increasing by approximately 0.4 V DC at intervals of approximately 1 second. When the meter representing the cold water flow valve actuator reached 0 V DC and the meter representing the hot water flow valve actuator reached 10V, all activity was stopped. The first potentiometer was then increased until 20° C. was shown on the display 46 for the first client station. After a few seconds, the voltage meters began to swing in the opposite fashion, with the voltage meter representing the cold water flow valve actuator showing a higher voltage reading and the voltage meter representing the hot water flow valve actuator decreasing by approximately 0.4 V at intervals of approximately 1 second. This interval of 0.4 V, which corresponds to a valve movement of a few degrees, provides quite accurate and repeatable water flow rate and temperature changes at the water appliance. Depending on the valve actuator, and the temperature swing that must occur, the control signals to the actuator may vary by more or less than 0.4 V. When the meter representing the cold water flow valve actuator reached 10 V DC and the meter representing the hot water flow valve actuator reached 0 V DC, all activity was stopped. The OFF button was then pressed (since the default run time was set to infinity) and the voltage meters provided a reading of 0 V. This test shows that the values that are provided by the sensor are used to adjust the control voltages that are sent to the actuators depending on the network water usage.

In Test #3, an administrator configured the first setting for the first local user on the second client station to have a hot water flow rate of 75%, a cold water flow rate of 25%, a final temperature of 40° C. and an infinite water running time. The settings remained the same on the first client station as they were in Test #1. The first setting on the first client station was then initiated. The voltage meters both then provided a reading of 5 V DC for the hot and cold flow rate valve actuators for the first water appliance. The first setting on the second client station was then initiated. The first and second potentiometers were at the lowest setting and the temperature reading on the display 46 of the first and second client stations both showed 1° C. The first and second client stations both showed that water was being adjusted at the same time; i.e. the LED fields 62 for both client stations started blinking yellow. The first potentiometer was then slowly increased until 14° C. was shown on the display 46 of the first client station. After a few seconds, the LED field 62 was showing a solid green color and the message that the "water was OK" was shown on the display 46 of the first client station.

During this time, the second potentiometer was also slowly increased until 41° C. was shown on the display 46 of the second client station. After a few seconds, the LED field 62 was showing a solid green color and the message that the water temperature was OK was shown on the display 46 of the second client station. This demonstrates that the appliance control station 12 exhibits an acceptable deviation of +/−1° C. Further, the testing showed that both client stations were receiving temperature readings from the control unit 14 every 2 seconds (this interval may be adjusted). The Off touch keys were then pressed for both client stations and the system 10 returned to the idle state. The test showed no signals of slow-down or server contention as a result of both clients being online at the same time.

In Test #4, an administrator configured the first client station to operate with a 50% cold water flow rate and a 50% hot water flow rate for a time duration of 30 seconds. The voltage meters then each read 5 V DC for the hot and cold flow valve actuators. The first potentiometer was then increased until 60° C. was shown on the display 46 of the first client station. A scald warning then appeared on the display 46 and the LED field 62 started blinking with a red color. The OFF button was then pressed and the readings from the voltage meters reduced to 0 V DC. The scald threshold value was 60° C. in this case, but this threshold value can be set to any desired level by the administrator. When this occurs, the actuators are provided with a control signal of 0V DC (i.e. the valves are closed).

Accordingly, in one embodiment the control unit 14 may be configured to perform a complete shutdown of both the hot and cold valves when a programmed temperature is reached at a given client station 30. The control unit 14 simply requires the identification number for the given client station 30. Further the display 46 of the "offending" client station 30 may display the message "SAFETY SHUTDOWN".

Alternatively, in another embodiment, when a maximum temperature is reached, the actuator corresponding to the hot water valve can be given a control signal to close the hot water valve while the actuator corresponding to the cold water valve can be given a control signal to increase the opening in the cold water valve to provide enough cold water to reduce the temperature of the water below the scald threshold to a safe value. The converse applies when a low minimum temperature is reached.

Some elements of the invention such as the programs that are run by the client processor 42 and the control unit 14 may be implemented via a computer program which may be written in C, C++, Labview™ or any other suitable programming language. The control program may be saved in the memory unit 20 and may include a client program module that provides the functionality of the client station and a control program module that controls the overall operation of the control system 10. These programs are typically executed at the client station 30 and control unit 14, respectively. These computer program modules comprise computer instructions that are adapted to perform the steps of the various processes that are described herein. The computer program may comprise other modules or classes, as is known to those skilled in object oriented programming, that are implemented and structured according to the structure of the processes. In one embodiment, separate software modules or classes may be designed for each of the processes. Alternatively, the functionality of these components may be combined into a smaller number of software modules where appropriate. Further, in another embodiment, the LABVIEW™ software package may be used for implementation purposes. In this case, various LABVIEW™ software tools can be used for measurement and control purposes. The LABVIEW™ software package may also be used to develop a GUI interface at the level of the control unit 14 with which an administrator may interact to monitor the appliance control system 10. In one case, the GUI interface may be implemented as a touch interface/screen at the control unit 14.

The system 10 of the invention uses a common piece of equipment, i.e. the control station 12, to control and balance a complete network of fixtures. Also, the system 10 uses less hardware compared to prior devices. All parts in the system 10 are also UL/CSA/CE compliant. The embodiment of the invention which uses an Ethernet structural framework enables remote access for monitoring and controlling the network of appliances plus the ease for service and increasing the network size without overloading or bringing down the network. Further, the Ethernet allows other IP based services to be easily added to the system 10 which includes water metering, hot water usage records, SNMP control, etc. In addition, the control unit 14 uses a mean priority number per client station to address the dynamic water supply issue from a common hot/cold water supply. A client station with a higher mean priority number will take priority over a client station with a lower mean priority number in instances where the control unit must send control voltages to actuators associated with these two different client stations at the same time. In addition, in one embodiment, the actuators, which may be electronic proportional solenoid valves, are the only active mechanical part of the system 10 which increases the robustness of the system 10 to mechanical failure.

The system of the invention may be used in heath care institutions, nurseries, senior living communities, and various buildings such as hotels, homes and the like. Any environment may use the invention in which there is a need for a person to set and maintain constant tap water temperature and pressure in order to prevent hot water scalding and thermal shock as well as to allow a person to remotely read the current values of pressure/temperature from interactive display. Pressure may be controlled based on the user settings submitted to the control station 12 for a given client station. For instance, when a temperature change is effected at a water appliance, actuators change the water flow rate which has an effect of increasing or decreasing pressure at the water appliance. In this fashion, the control station 12 can monitor pressure values at various water appliances.

It should be understood that various modifications can be made to the embodiments described and illustrated herein, without departing from the invention, the scope of which is defined in the appended claims.

The invention claimed is:

1. An appliance control system for controlling a plurality of sets of appliances in a network, the system comprising:
   a) a control station having a control unit for controlling the plurality of sets of appliances and a switch unit for routing control signals in the network, the control station being remotely located from the plurality of sets of appliances;
   b) a plurality of actuators connected to the control station for receiving the control signals therefrom, the plurality of actuators being connected to and controlling the plurality of sets of appliances;
   c) a plurality of sensors connected to the sets of appliances and the control station for recording information therefrom, the plurality of sensors connected to the control station for providing the recorded information to the control station; and
   d) a plurality of client stations, each client station located with one of the plurality of sets of appliances, each client station being connected to the switch unit and adapted to allow a user to make requests to the control station for using the at least one appliance of the set of appliances located with the client station;
   wherein the plurality of sets of appliances comprise water appliances, and for a given set of appliances, the system includes a multi-port valve having one input connected to the actuators corresponding with the given set of appliances and multiple output ports for connecting to more than one water appliance associated with the given set of appliances.

2. The appliance control system of claim 1, wherein the appliance control system is configured to operate in several modes of operation including: a user mode, a manual mode, a program mode and an administrator mode.

3. The appliance control system of claim 1, wherein a mean priority number is associated with each client station, and wherein, during use, when the appliance control system receives water flow requests from two different client stations at the same time, the appliance control system is adapted to give priority to the water appliances associated with the client station that has a higher mean priority number.

4. The appliance control system of claim 1, wherein the sensors associated with the given set of appliances includes a temperature sensor, and wherein the control unit is adapted to perform a calibration process for calibrating the temperature sensor for reading water temperature at the water appliances, the calibration process including determining a nominal resistance value and a material constant for the temperature sensor.

5. The appliance control system of claim 1, wherein the control unit is adapted to store several user accounts for a given client station, and the several user accounts include information for several settings for a given user.

6. The appliance control system of claim 1, wherein the sensors associated with the given set of appliances include a proximity sensor for allowing the user to activate one of the water appliances in a non-touch fashion, and wherein the control unit is adapted to store operational parameters for operating the water appliances when activated in a non-touch fashion.

7. The appliance control system of claim 1, wherein the control unit is adapted to allow an administrator to enter a fixture order which provides a priority order for the control unit for servicing the set of appliances associated with a given client station.

8. A method for controlling a network of a plurality sets of water appliances, the method comprising:
   a) providing a control station including a control unit for centrally controlling the network and a switch unit for routing control signals in the network, the control station being remotely located from the plurality of sets of water appliances;
   b) providing a plurality of client stations for the plurality of sets of water appliances, a given client station being associated located with at least one of the plurality of sets of water appliances;
   c) providing actuators connected to the control station and the plurality of sets of water appliances for allowing control signals from the control station to control the plurality of sets of water appliances;
   d) providing sensors connected to the plurality of sets of water appliances and the control station for recording information about the plurality of sets of water appliances and providing the information to the control station;
   e) providing several user accounts for one of the client stations and several settings for one of the user accounts; and
   f) providing a mean priority number for each client station wherein the control station uses the mean priority number when the plurality of sets of water appliances are connected to a common water supply to determine priority for servicing the plurality of sets of water appliances.

9. The method of claim 8, wherein the method further includes providing a proximity sensor for at least one of the plurality of sets of water appliances for allowing the user to activate a given water appliance in a non-touch fashion, and wherein the method further includes storing operational parameters for a given user for operating the given water appliance when activated in a non-touch fashion.

10. The method of claim 8, wherein a given set of water appliances include a plurality of water fixtures and the method further includes allowing an administrator to enter a fixture order for providing a priority order for servicing the water fixtures.

11. The method of claim 8, wherein the method further includes performing calibration for compensating for pipe length and diameter for delivering water to a given water appliance such that a temperature of the delivered water is at a desired level, the calibration including providing control signals from the control station to the given water appliance for providing water at a first calibration temperature; measuring an actual temperature at the outlet of the water appliance and using controls at the associated client station to adjust the actual temperature to the desired temperature; storing the amount of adjustment; driving one of the actuators associated with the given water appliance to a maximum setting; recording a second calibration temperature at the outlet of the water appliance and storing the second calibration temperature.

12. An appliance control system for controlling a plurality of sets of appliances in a network, the system comprising:
   a) a control station having a control unit for controlling the plurality of sets of appliances and a switch unit for routing control signals in the network, the control station being remotely located from the plurality of sets of appliances;
   b) a plurality of actuators connected to the control station for receiving the control signals therefrom, the plurality of actuators being connected to and controlling the plurality of sets of appliances;
   c) a plurality of sensors, connected to the sets of appliances and the control station for recording information therefrom, the plurality of sensors connected to the control station for providing the recorded information to the control station; and
   d) a plurality of client stations, each client station located with one of the plurality of sets of appliances, each client station being connected to the switch unit and adapted to for allow a user to make requests to the control station for using the at least one appliance of the set of appliances located with the client station;
wherein the appliance control system is configured to operate in several modes of operation for the network including a user mode, a manual mode, a program mode and an administration mode.

13. The appliance control system of claim 12, wherein a mean priority number is associated with each client station, the sets of appliances are water appliances, and wherein, during use, when the appliance control system receives water flow requests from two different client stations at the same time, the appliance control system is adapted to give priority to the water appliances associated with the client station that has a higher mean priority number.

14. The appliance control system of claim 12, wherein a given set of appliances includes water appliances and the sensors associated with the given set of appliances includes a temperature sensor, and wherein the control unit is adapted to perform a calibration process for calibrating the temperature sensor for reading water temperature at the water appliances, the calibration process including determining a nominal resistance value and a material constant for the temperature sensor.

15. The appliance control system of claim 12, wherein the control unit is adapted to store several user accounts for a given client station, and the several user accounts include information for several settings for a given user.

16. The appliance control system of claim 12, wherein a given set of appliances include water appliances and the sensors associated with the given set of appliances include a proximity sensor for allowing the user to activate one of the water appliances in a non-touch fashion, and wherein the control unit is adapted to store operational parameters for operating the water appliances when activated in a non-touch fashion.

17. The appliance control system of claim 12, wherein the control unit is adapted to allow an administrator to enter a fixture order which provides a priority order for the control unit for servicing the set of appliances associated with a given client station.

18. An appliance control system for controlling a plurality of sets of appliances in a network, the system comprising:
   b) a control station having a control unit for controlling the plurality of sets of appliances and a switch unit for routing control signals in the network, the control station being remotely located from the plurality of sets of appliances;

b) a plurality of actuators connected to the control station for receiving the control signals therefrom, the plurality of actuators being connected to and controlling the plurality of sets of appliances;

c) a plurality of sensors, connected to the sets of appliances and the control station for recording information therefrom, the plurality of sensors connected to the control station for providing the recorded information to the control station; and d) a plurality of client stations, each client station located with one of the plurality of sets of appliances, each client station being connected to the switch unit and adapted to for allow a user to make requests to the control station for using at least one appliance of the set of appliances located with the client station;

wherein the control unit is adapted to store several user accounts for a given client station, and the several user accounts include information for several settings for a given user.

19. The appliance control system of claim 18, wherein a mean priority number is associated with each client station, the sets of appliances are water appliances, and wherein, during use, when the appliance control system receives water flow requests from two different client stations at the same time, the appliance control system is adapted to give priority to the water appliances associated with the client station that has a higher mean priority number.

20. The appliance control system of claim 18, wherein a given set of appliances includes water appliances and the sensors associated with the given set of appliances includes a temperature sensor, and wherein the control unit is adapted to perform a calibration process for calibrating the temperature sensor for reading water temperature at the water appliances, the calibration process including determining a nominal resistance value and a material constant for the temperature sensor.

21. The appliance control system of claim 18, wherein the method further includes providing a proximity sensor for at least one set of a plurality of sets of water appliances for allowing the user to activate a given water appliance in a non-touch fashion, and wherein the method further includes storing operational parameters for a given user for operating the given water appliance when activated in a non-touch fashion.

22. The appliance control system of claim 18, wherein the control unit is adapted to allow an administrator to enter a fixture order which provides a priority order for the control unit for servicing the set of appliances associated with a given client station.

23. A method for controlling a network of a plurality sets of water appliances, the method comprising:

a) providing a control station including a control unit for centrally controlling the network and a switch unit for routing control signals in the network, the control station being remotely located from the plurality of sets of water appliances;

b) providing a plurality of client stations for the plurality of sets of water appliances, a given client station being located with at least one of the plurality of sets of water appliances;

c) providing actuators connected to the control station and the plurality of sets of water appliances for allowing control signals from the control station to control the plurality of sets of water appliances;

d) providing sensors connected to the plurality of sets of water appliances and the control station for recording information about the plurality of sets of water appliances and providing the information to the control station;

e) providing several user accounts for one of the client stations and several settings for one of the user accounts; and f) providing several modes of operation for the network including a user mode, a manual mode, a program mode and an administration mode.

24. A method for controlling a network of a plurality sets of water appliances, the method comprising:

a) providing a control station including a control unit for centrally controlling the network and a switch unit for routing control signals in the network, the control station being remotely located from the plurality of sets of water appliances;

b) providing a plurality of client stations for the plurality of sets of water appliances, a given client station being located with at least one of the plurality of sets of water appliances;

c) providing actuators connected to the control station and the plurality of sets of water appliances for allowing control signals from the control station to control the plurality of sets of water appliances;

d) providing sensors connected to the plurality of sets of water appliances and the control station for recording information about the plurality of sets of water appliances and providing the information to the control station;

e) providing several user accounts for one of the client stations and several settings for one of the user accounts; and f) performing calibration for compensating for pipe length and diameter for delivering water to a given water appliance such that a temperature of the delivered water is at a desired level, the calibration including providing control signals from the control station to the given water appliance for providing water at a first calibration temperature; measuring an actual temperature at an outlet of the water appliance and using controls at an associated client station to adjust an actual temperature to an desired temperature; storing an amount of adjustment; driving one of the actuators associated with the given water appliance to a maximum setting; recording a second calibration temperature at the outlet of the water appliance and storing the second calibration temperature.

25. The method of claim 24, wherein the method further includes providing a proximity sensor for at least one of the plurality of sets of water appliances for allowing the user to activate a given water appliance in a non-touch fashion, and wherein the method further includes storing operational parameters for a given user for operating the given water appliances when activated in a non-touch fashion.

26. The method of claim 24, wherein a given set of water appliances includes a plurality of water fixtures and the method further includes allowing an administrator to enter a fixture order for providing a priority order for servicing the water fixtures.

* * * * *